(12) United States Patent
Zhu et al.

(10) Patent No.: US 11,521,284 B2
(45) Date of Patent: Dec. 6, 2022

(54) DATA EXTRACTION METHOD AND APPARATUS

(71) Applicant: Hangzhou Hikvision System Technology Co., Ltd., Hangzhou (CN)

(72) Inventors: Jingcheng Zhu, Hangzhou (CN); Guizhu Xiao, Hangzhou (CN); Shengna Lin, Hangzhou (CN); Liangjin Hu, Hangzhou (CN)

(73) Assignee: Hangzhou Hikvision System Technology Co., Ltd., Hangzhou (CN)

( * ) Notice: Subject to any disclaimer, the term of this patent is extended or adjusted under 35 U.S.C. 154(b) by 269 days.

(21) Appl. No.: 16/468,092

(22) PCT Filed: Sep. 5, 2018

(86) PCT No.: PCT/CN2018/104125
§ 371 (c)(1),
(2) Date: Jun. 10, 2019

(87) PCT Pub. No.: WO2019/128296
PCT Pub. Date: Jul. 4, 2019

(65) Prior Publication Data
US 2022/0005135 A1    Jan. 6, 2022

(30) Foreign Application Priority Data

Dec. 29, 2017   (CN) .......................... 201711475720.3
Mar. 12, 2018   (CN) .......................... 201810202072.2

(51) Int. Cl.
*G08G 1/01*      (2006.01)
*G06Q 50/26*     (2012.01)
(Continued)

(52) U.S. Cl.
CPC .......... *G06Q 50/26* (2013.01); *G06F 16/245* (2019.01); *G06F 21/6218* (2013.01);
(Continued)

(58) Field of Classification Search
CPC ... G06Q 50/26; G06F 16/245; G06F 21/6218; G07C 5/008; G07C 5/02; G08G 1/0125; G08G 1/054; G08G 1/0141
See application file for complete search history.

(56) References Cited

U.S. PATENT DOCUMENTS 8,744,412 B1     6/2014   Cazanas et al.
10,126,740 B2 *  11/2018  Jackson ............... G08G 1/0175
(Continued)

FOREIGN PATENT DOCUMENTS

CN     101465065 A    6/2009
CN     102142196 A    8/2011
(Continued)

OTHER PUBLICATIONS

Jan. 18, 2021, Extended European Search Report for European Patent Application No. EP 18 88 2302.
(Continued)

*Primary Examiner* — Brian F Shaw
(74) *Attorney, Agent, or Firm* — Clements Bernard Baratta; Lawrence A. Baratta, Jr.

(57) ABSTRACT

A data extraction method and apparatus including: obtaining a data extraction instruction sent by a client, wherein the data extraction instruction is an instruction issued by a target checker logging in to the client, and the data extraction instruction carries a target user identifier of the target checker; obtaining extraction authority information for the target user identifier according to a preset correspondence and the target user identifier as target extraction authority information, wherein the preset correspondence comprises: a plurality of correspondences between user identifiers and extraction authority information, and the extraction authority information is information for representing an authority of a corresponding checker to extract vehicle passing data; extracting, from to-be-checked vehicle passing data, first
(Continued)

to-be-checked vehicle passing data that matches the target extraction authority information; and sending the first to-be-checked data to the client. With the embodiments of the present application, the number of manual operations of the checker is reduced in extracting vehicle passing data, thereby further reducing the number of manual operations in data checking, and improving data checking efficiency.

18 Claims, 4 Drawing Sheets

(51) Int. Cl.
    *G07C 5/02*     (2006.01)
    *G06F 21/62*     (2013.01)
    *G07C 5/00*     (2006.01)
    *G06F 16/245*     (2019.01)

(52) U.S. Cl.
    CPC ............... *G07C 5/008* (2013.01); *G07C 5/02* (2013.01); *G08G 1/0125* (2013.01)

(56) References Cited

U.S. PATENT DOCUMENTS

2004/0252193 A1     12/2004     Higgins
2007/0199048 A1     8/2007     Kaleja
2013/0166138 A1     6/2013     Yun et al.

FOREIGN PATENT DOCUMENTS

| | | |
|---|---|---|
| CN | 102546627 A | 7/2012 |
| CN | 104025159 A | 9/2014 |
| CN | 105205752 A | 12/2015 |
| CN | 106354789 A | 1/2017 |
| CN | 106484806 A | 3/2017 |
| CN | 106710225 A | 5/2017 |
| DE | 102008041944 A1 | 3/2010 |

OTHER PUBLICATIONS

Li, Zhe; Design and Development of Patented Intelligent Management AYTP System Model; Beijing University of Technology, Mar. 15, 2015.

Zhang, Jianwei; Design and Implementation of an Platform for High-Definition and Intelligent Management of Checkpoints; University of Electronic Science and Technology of China, Mar. 15, 2016.

International Search Report for International Application No. PCT/CN2018/104125.

* cited by examiner

DATA EXTRACTION METHOD AND APPARATUS

The present application claims the priorities to a Chinese Patent Application No. 201711475720.3, filed with the China National Intellectual Property Administration on Dec. 29, 2017 and entitled "Data extraction method and apparatus", and a Chinese Patent Application No. 201810202072.2, filed with the China National Intellectual Property Administration on Mar. 12, 2018 and entitled "Data extraction method and apparatus", which are incorporated herein by reference in their entirety.

TECHNICAL FIELD

The present application relates to the field of intelligent transportation technology, and in particular, to a data extraction method and apparatus.

BACKGROUND

In the field of intelligent transportation, the data analysis system can obtain a large amount of vehicle passing data, which is data recognized from images and/or videos acquired by the image acquisition device. The vehicle passing data may have to-be-checked violation data. Therefore, it is necessary to check the obtained vehicle passing data to determine whether the vehicle passing data is violation data. In one case, when the vehicle passing data indicates vehicle violation, the vehicle passing data may be determined to be violation data. The vehicle violation includes, but is not limited to, parking violation, speeding, reverse driving, illegal lane change, and red light violation. Due to the particularity of the check of the vehicle passing data, it is necessary to manually check whether the vehicle passing data is violation data, that is, a checker needs to manually identify whether the vehicle passing data is violation data.

In the process of manually checking the vehicle passing data, the checker first needs to extract to-be-checked vehicle passing data from massive vehicle passing data, and then manually check the extracted vehicle passing data. In the existing process of extracting the vehicle passing data, the checker manually inputs extraction conditions of the to-be-checked vehicle passing data, and a data analysis system extracts the required vehicle passing data from the massive passing data according to the extraction conditions input by the checker and device authority information corresponding to the checker pre-stored in the data analysis system, and pushes it to the checker. In the existing process of extracting the vehicle passing data, the checker may have the authority to obtain all the vehicle passing data. The device authority information may be: information for representing the checker's authority to obtain images and/or videos acquired by the image acquisition device. When the checker has the authority to obtain the images and/or videos acquired by the image acquisition device, he or she may obtain the images and/or videos, and check whether vehicle passing data detected from the obtained images and/or videos is violation data.

The above extraction condition may be any combination of data attributes of the vehicle passing data. The data attributes may include, but are not limited to, checkpoint identifier, vehicle identifier, vehicle type, vehicle violation type, vehicle violation act, time information, vehicle violation location, and so on. The violation type may include parking violation, speeding, reverse driving, lane change violation, red light violation, and so on. The vehicle violation act may include an act that a vehicle is not driven in a vehicle lane, and so on.

For example, extraction conditions input by the checker A are: checkpoint identifier: checkpoint identifier 1 and checkpoint identifier 2 (the checkpoint identifier 1 is an identifier of a checkpoint 1 and the checkpoint identifier 2 is an identifier of a checkpoint 2), vehicle type: bus and car, vehicle violation type: red light violation. Device authority information pre-stored in a data analysis system indicates that the checker A has the authority to obtain the images and/or videos acquired by the image acquisition device corresponding to the checkpoint 1 and checkpoint 2. At this time, the data analysis system extracts vehicle passing data whose checkpoint identifier is checkpoint identifier 1 or checkpoint identifier 2, whose vehicle type is bus or car, and whose vehicle violation type is red light violation, and then pushes the extracted vehicle passing data to the checker A.

It can be seen that the checker needs to manually input the extraction conditions of the vehicle passing data in the existing process of extracting the vehicle passing data, and there are numerous operations in the data checking process. Thus, the data checking efficiency is low.

SUMMARY

The objective of the present application is to provide a data extraction method and apparatus, so as to reduce the number of manual operations of a checker during the extracting of vehicle passing data, thereby further reducing the number of manual operations in data checking, and improving data checking efficiency.

In a first aspect, an embodiment of the present application provides a data extraction method including:

obtaining a data extraction instruction sent by a client, wherein the data extraction instruction is an instruction issued by a target checker logging in to the client, and the data extraction instruction carries a user identifier of the target checker as a target user identifier;

obtaining extraction authority information for the target user identifier according to a preset correspondence and the target user identifier as target extraction authority information, wherein the preset correspondence includes: a plurality of correspondences between user identifiers and extraction authority information, and the extraction authority information is information for representing an authority of a corresponding checker to extract vehicle passing data;

extracting, from to-be-checked vehicle passing data, to-be-checked vehicle passing data that matches the target extraction authority information, as first to-be-checked data; and sending the first to-be-checked data to the client.

Optionally, before extracting, from to-be-checked vehicle passing data, to-be-checked vehicle passing data that matches the target extraction authority information, as first to-be-checked data, the method further includes:

determining, according to the target user identifier, device authority information pre-configured for the target checker, as target device authority information, wherein the device authority information is information for representing an authority of a corresponding checker to obtain images and/or videos acquired by an image acquisition device; and the step of extracting, from to-be-checked vehicle passing data, to-be-checked vehicle passing data that matches the target extraction authority information, as first to-be-checked data, includes:

extracting, from the to-be-checked vehicle passing data, to-be-checked vehicle passing data that matches the target extraction authority information and the target device authority information, as first to-be-checked data.

Optionally, before obtaining extraction authority information for the target user identifier according to a preset correspondence and the target user identifier as target extraction authority information, the method further includes:

determining, according to the preset correspondence and the target user identifier, whether a first correspondence including the target user identifier exists in the preset correspondence;

when the first correspondence exists, performing the step of obtaining extraction authority information for the target user identifier according to a preset correspondence and the target user identifier as target extraction authority information; and when the first correspondence does not exist, the method further includes:

extracting, from the to-be-checked vehicle passing data, to-be-checked vehicle passing data that matches the target device authority information, as second to-be-checked data; and sending the second to-be-checked data to the client.

Optionally, the to-be-checked vehicle passing data is arranged in chronological order; each piece of to-be-checked vehicle passing data contains a checkpoint identifier; the target extraction authority information includes at least information defining that the target checker has an authority to extract to-be-checked vehicle passing data containing the target checkpoint identifier; and the step of extracting, from to-be-checked vehicle passing data, to-be-checked vehicle passing data that matches the target extraction authority information, as first to-be-checked data, includes:

traversing the to-be-checked vehicle passing data according to an arrangement order of the to-be-checked vehicle passing data, and determining a first piece of to-be-checked vehicle passing data that matches the target extraction authority information, as first vehicle passing data, wherein a checkpoint identifier contained in the first vehicle passing data is the target checkpoint identifier, and the first vehicle passing data is used as the first to-be-checked data;

continuing to traverse the to-be-checked vehicle passing data, and sequentially determining to-be-checked vehicle passing data that meets a first preset condition, as second vehicle passing data, wherein the first preset condition includes: to-be-checked vehicle passing data matching the target extraction authority information, and a checkpoint identifier contained therein being the same as the checkpoint identifier contained in the first vehicle passing data;

determining the determined second vehicle passing data as the first to-be-checked data; and extracting all the determined first to-be-checked data.

Optionally, determining the determined second vehicle passing data as the first to-be-checked data includes:

determining all the determined second vehicle passing data as the first to-be-checked data; or determining a first preset number of pieces of firstly determined second vehicle passing data in the determined second vehicle passing data, as the first to-be-checked data.

Optionally, before determining a first preset number of pieces of firstly determined second vehicle passing data in the determined second vehicle passing data, as the first to-be-checked data, the method further includes:

determining whether the number of pieces of the determined second vehicle passing data is not less than the first preset number;

when the number of pieces of the determined second vehicle passing data is not less than the first preset number, performing the step of determining the first preset number of pieces of firstly determined second vehicle passing data in the determined second vehicle passing data, as the first to-be-checked data;

when the number of pieces of the determined second vehicle passing data is less than the first preset number, the method further includes:

determining the remaining first to-be-checked data by the following steps until the number of pieces of all the determined first to-be-checked data equals to the first preset number plus one, or, no to-be-checked vehicle passing data that matches the target extraction authority information exists in to-be-checked vehicle passing data other than the to-be-checked vehicle passing data that has been determined as the first to-be-checked data:

step A: traversing to-be-checked vehicle passing data other than the to-be-checked vehicle passing data that has been determined as the first to-be-checked data according to the arrangement order of the to-be-checked vehicle passing data, and determining a first piece of to-be-checked vehicle passing data that matches the target extraction authority information, as new first vehicle passing data, wherein a checkpoint identifier contained in the new first vehicle passing data is the target checkpoint identifier, and the new first vehicle passing data is used as the first to-be-checked data;

step B: continuing to traverse to-be-checked vehicle passing data other than the to-be-checked vehicle passing data that has been determined as the first to-be-checked data, and sequentially determining to-be-checked vehicle passing data that meets a second preset condition, as new second vehicle passing data, wherein the second preset condition includes: to-be-checked vehicle passing data matching the target extraction authority information, and a checkpoint identifier contained therein being the same as the checkpoint identifier contained in the new first vehicle passing data;

step C: determining whether the number of pieces of the determined new second vehicle passing data is not less than a first number, wherein the first number equals to the first preset number plus one and minus the number of pieces of the determined first to-be-checked data; and step D: selecting a first number of pieces of firstly determined new second vehicle passing data in the determined new second vehicle passing data as the first to-be-checked data, when the number of pieces of the determined new second vehicle passing data is not less than the first number; and returning to step A when the number of pieces of the determined new second vehicle passing data is less than the first number.

Optionally, the to-be-checked vehicle passing data is arranged in chronological order; each piece of to-be-checked vehicle passing data contains a checkpoint identifier; the target extraction authority information includes at least: information defining that the target checker has an authority to extract to-be-checked vehicle passing data containing the target checkpoint identifier;

the step of extracting, from to-be-checked vehicle passing data, to-be-checked vehicle passing data that matches the target extraction authority information, as first to-be-checked data, includes:

traversing the to-be-checked vehicle passing data according to the arrangement order of the to-be-checked vehicle passing data, and determining a first piece of to-be-checked vehicle passing data that matches the target extraction authority information, as third vehicle passing data, wherein a checkpoint identifier contained in the third vehicle passing data is the target checkpoint identifier, and the third vehicle passing data is used as the first to-be-checked data;

continuing to traverse the to-be-checked vehicle passing data, and sequentially determining a second preset number of to-be-checked vehicle passing data that firstly meets a third preset condition, as the first to-be-checked data, wherein the third preset condition includes: to-be-checked vehicle passing data matching the target extraction authority information, and a checkpoint identifier contained therein being the same as the checkpoint identifier contained in the third vehicle passing data; and extracting all the determined first to-be-checked data.

Optionally, before extracting, from the to-be-checked vehicle passing data, to-be-checked vehicle passing data that matches the target extraction authority information, as first to-be-checked data, the method further includes determining the to-be-checked vehicle passing data, including:

extracting, from vehicle passing data, vehicle passing data that meets a preset condition, and caching the extracted vehicle passing data in a preset data pool as the to-be-checked vehicle passing data;

wherein the vehicle passing data that meets the preset condition is vehicle passing data that meets extraction authority information for any user identifier for the preset data pool, and does not meet a preset data filtering condition, wherein the user identifier is a user identifier in the preset correspondence.

Optionally, after sending the first to-be-checked data to the client, the method further includes:

receiving data invalidation information fed back by the client, wherein the data invalidation information is information that is fed back by the client for first to-be-checked data when the checker logging in to the client determines that this first to-be-checked data is non-violation data;

counting and storing the number of pieces of the received data invalidation information according to the user identifier of the checker logging in to the client; and counting and storing the number of pieces of the received data invalidation information according to a checkpoint identifier of each piece of first to-be-checked vehicle passing data that is determined as non-violation data.

Optionally, before sending the first to-be-checked data to the client, the method further includes:

setting a preset extracted mark for each piece of first to-be-checked data, so that a checker other than the target checker cannot extract the first to-be-checked data.

In another aspect, an embodiment of the present application provides a data extraction apparatus including:

a first obtaining module, configured for obtaining a data extraction instruction sent by a client, wherein the data extraction instruction is an instruction issued by a target checker logging in to the client, and the data extraction instruction carries a user identifier of the target checker as a target user identifier;

a second obtaining module, configured for obtaining extraction authority information for the target user identifier according to a preset correspondence and the target user identifier as target extraction authority information, wherein the preset correspondence includes: a plurality of correspondences between user identifiers and extraction authority information, and the extraction authority information is information for representing an authority of a corresponding checker to extract vehicle passing data;

a first extraction module, configured for extracting, from to-be-checked vehicle passing data, to-be-checked vehicle passing data that matches the target extraction authority information, as first to-be-checked data; and a first sending module, configured for sending the first to-be-checked data to the client.

Optionally, the apparatus further includes:

a first determination module, configured for before to-be-checked vehicle passing data that matches the target extraction authority information is extracted from to-be-checked vehicle passing data, determining, according to the target user identifier, device authority information pre-configured for the target checker, as target device authority information, wherein the device authority information is information for representing an authority of a corresponding checker to obtain images and/or videos acquired by an image acquisition device; and the first extraction module is further configured for:

extracting, from the to-be-checked vehicle passing data, to-be-checked vehicle passing data that matches the target extraction authority information and the target device authority information, as first to-be-checked data.

Optionally, the apparatus further includes a judgment module, a second extraction module and a second sending module, wherein the judgment module is configured for before the extraction authority information for the target user identifier is obtained according to the preset correspondence and the target user identifier as the target extraction authority information, determining, according to the preset correspondence and the target user identifier, whether a first correspondence including the target user identifier exists in the preset correspondence;

the second obtaining module is triggered when the first correspondence exists; and the second extraction module is triggered when the first correspondence does not exist;

the second extraction module is configured for extracting, from the to-be-checked vehicle passing data, to-be-checked vehicle passing data that matches the target device authority information, as second to-be-checked data; and the second sending module is configured for sending the second to-be-checked data to the client.

Optionally, the to-be-checked vehicle passing data is arranged in chronological order; each piece of to-be-checked vehicle passing data contains a checkpoint identifier; the target extraction authority information includes at least information defining that the target checker has an authority to extract to-be-checked vehicle passing data containing the target checkpoint identifier;

the first extraction module includes:

a first traversal determination unit, configured for traversing the to-be-checked vehicle passing data according to an arrangement order of the to-be-checked vehicle passing data, and determining a first piece of to-be-checked vehicle passing data that matches the target extraction authority information, as first vehicle passing data, wherein a checkpoint identifier contained in the first vehicle passing data is the target checkpoint identifier, and the first vehicle passing data is used as the first to-be-checked data;

a second traversal determination unit, configured for continuing to traverse the to-be-checked vehicle passing data, and sequentially determining to-be-checked vehicle passing data that meets a first preset condition, as second vehicle passing data, wherein the first preset condition includes: to-be-checked vehicle passing data matching the target extraction authority information, and a checkpoint identifier contained therein being the same as the checkpoint identifier contained in the first vehicle passing data;

a first determination unit, configured for determining the determined second vehicle passing data as the first to-be-checked data; and an extraction unit, configured for extracting all the determined first to-be-checked data.

Optionally, the first determination unit includes:

a first determination sub-module, configured for determining all the determined second vehicle passing data as the first to-be-checked data; or a second determination sub-module, configured for determining a first preset number of pieces of firstly determined second vehicle passing data in the determined second vehicle passing data, as the first to-be-checked data.

Optionally, the first determination unit further includes a judgment sub-module and a third determination sub-module, wherein the judgment sub-module is configured for before the first preset number of pieces of firstly determined second vehicle passing data in the determined second vehicle passing data is determined as the first to-be-checked data, determining whether the number of pieces of the determined second vehicle passing data is not less than the first preset number;

the second determination sub-module is triggered when the number of pieces of the determined second vehicle passing data is not less than the first preset number; and the third determination sub-module is triggered when the number of pieces of the determined second vehicle passing data is less than the first preset number;

wherein the third determination sub-module is configured for determining the remaining first to-be-checked data until the number of pieces of all the determined first to-be-checked data equals to the first preset number plus one, or, no to-be-checked vehicle passing data that matches the target extraction authority information exists in to-be-checked vehicle passing data other than the to-be-checked vehicle passing data that has been determined as the first to-be-checked data; and the third determination sub-module includes:

a first traversal determination subunit, configured for traversing to-be-checked vehicle passing data other than the to-be-checked vehicle passing data that has been determined as the first to-be-checked data according to the arrangement order of the to-be-checked vehicle passing data, and determining a first piece of to-be-checked vehicle passing data that matches the target extraction authority information, as new first vehicle passing data, wherein a checkpoint identifier contained in the new first vehicle passing data is the target checkpoint identifier, and the new first vehicle passing data is used as the first to-be-checked data;

a second traversal determination subunit, configured for continuing to traverse to-be-checked vehicle passing data other than the to-be-checked vehicle passing data that has been determined as the first to-be-checked data, and sequentially determining to-be-checked vehicle passing data that meets a second preset condition, as new second vehicle passing data, wherein the second preset condition includes: to-be-checked vehicle passing data matching the target extraction authority information, and a checkpoint identifier contained therein being the same as the checkpoint identifier contained in the new first vehicle passing data;

a judgment subunit, configured for determining whether the number of pieces of the determined new second vehicle passing data is not less than a first number, wherein the first number equals to the first preset number plus one and minus the number of pieces of the determined first to-be-checked data; wherein a selecting subunit is triggered when the number of pieces of the determined new second vehicle passing data is not less than the first number; and the first traversal determination subunit is triggered when the number of pieces of the determined new second vehicle passing data is less than the first number; and the selecting subunit, configured for selecting a first number of pieces of firstly determined new second vehicle passing data in the determined new second vehicle passing data as the first to-be-checked data.

Optionally, the to-be-checked vehicle passing data is arranged in chronological order; each piece of to-be-checked vehicle passing data contains a checkpoint identifier; the target extraction authority information includes at least: information defining that the target checker has an authority to extract to-be-checked vehicle passing data containing the target checkpoint identifier;

the first extraction module is further configured for:
traversing the to-be-checked vehicle passing data according to the arrangement order of the to-be-checked vehicle passing data, and determining a first piece of to-be-checked vehicle passing data that matches the target extraction authority information, as third vehicle passing data, wherein a checkpoint identifier contained in the third vehicle passing data is the target checkpoint identifier, and the third vehicle passing data is used as the first to-be-checked data;

continuing to traverse the to-be-checked vehicle passing data, and sequentially determining a second preset number of to-be-checked vehicle passing data that firstly meets a third preset condition, as the first to-be-checked data, wherein the third preset condition includes: to-be-checked vehicle passing data matching the target extraction authority information, and a checkpoint identifier contained therein being the same as the checkpoint identifier contained in the third vehicle passing data, and extracting all the determined first to-be-checked data.

Optionally, the apparatus further includes:

a second determination module, configured for before to-be-checked vehicle passing data that matches the target extraction authority information is extracted from the to-be-checked vehicle passing data, as first to-be-checked data, determining the to-be-checked vehicle passing data, wherein the second determination module is further configured for:

extracting, from vehicle passing data, vehicle passing data that meets a preset condition, and caching the extracted vehicle passing data in a preset data pool as the to-be-checked vehicle passing data;

wherein the vehicle passing data that meets the preset condition is vehicle passing data that meets extraction authority information for any user identifier for the preset data pool, and does not meet a preset data filtering condition, wherein the user identifier is a user identifier in the preset correspondence.

Optionally, the apparatus further includes:

a receiving module, configured for after the first to-be-checked data is sent to the client, receiving data invalidation information fed back by the client, wherein the data invalidation information is information that is fed back by the client for first to-be-checked data when the checker logging in to the client determines that this first to-be-checked data is non-violation data;

a first counting and storing module, configured for counting and storing the number of pieces of the received data invalidation information according to the user identifier of the checker logging in to the client; and a second counting and storing module, configured for counting and storing the number of pieces of the received data invalidation information according to a checkpoint identifier of each piece of first to-be-checked vehicle passing data that is determined as non-violation data.

Optionally, the apparatus further includes:

a marking module, configured for before the first to-be-checked data is sent to the client, setting a preset extracted mark for each piece of first to-be-checked data, so that a checker other than the target checker cannot extract the first to-be-checked data.

In another aspect, an embodiment of the present application provides an electronic device, including: a processor, a communication interface, a memory, and a communication bus, wherein the processor, the communication interface and the memory communicate with each other through the communication bus;

the memory is configured to store a computer program;

the processor is configured to implement the data extraction method according to any one of the embodiments of the present invention when executing the computer program stored in the memory.

In another aspect, an embodiment of the present application provides a computer readable storage medium. The computer readable storage medium stores a computer program. The computer program is executed by a processor to cause the processor to perform the data extraction method according to any one of the embodiments of the present application.

In another aspect, an embodiment of the present application provides a computer program product which, when executed on a computer, causes the computer to perform the data extraction method according to any one of the embodiments.

In the embodiments of the present application, a data extraction instruction sent by a client is obtained, where the data extraction instruction is an instruction issued by a target checker logging in to the client, and the data extraction instruction carries a user identifier of the target checker as a target user identifier; extraction authority information for the target user identifier is obtained according to a preset correspondence and the target user identifier as target extraction authority information, wherein the preset correspondence includes: a plurality of correspondences between user identifiers and extraction authority information, and the extraction authority information is information for representing an authority of a corresponding checker to extract vehicle passing data; to-be-checked vehicle passing data that matches the target extraction authority information is extracted from the to-be-checked vehicle passing data, as first to-be-checked data; and the first to-be-checked data is sent to the client.

In the embodiments of the present application, a correspondence between each user identifier and extraction authority information is pre-set, that is, a correspondence between each checker and extraction authority information is pre-set. After a data extraction instruction sent by a target checker logging in to a client through the client is obtained, target extraction authority information may be automatically determined according to a user identifier of the target checker, i.e., target user identifier, carried in the data extraction instruction, and to-be-checked vehicle passing data matching the target extraction authority information is extracted from the to-be-checked vehicle passing data and sent to the client. Throughout data extraction, only by triggering the client to send the data extraction instruction, the target checker can obtain the required vehicle passing data without other operations, thereby reducing the number of manual operations of the checker in data extraction. This further reduces the number of manual operations in data checking and improves data checking efficiency. Of course, any product or method of the present application necessarily does not necessarily achieve all of the above advantages at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The embodiments of the present application will be described in more detail below with reference to the appended drawings. Obviously, the described embodiments are only some, and not all, of the embodiments of the present application. All other embodiments obtained based on the embodiments of the present application by those skilled in the art without any creative efforts fall into the scope of protection defined by the present application.

The embodiments of the present application provide a data extraction method and apparatus, so as to reduce the number of manual operations of a checker in a process of extracting vehicle passing data, and further reduce the number of manual operations in the data checked process, thereby improving the data checked efficiency.

Figure 1:
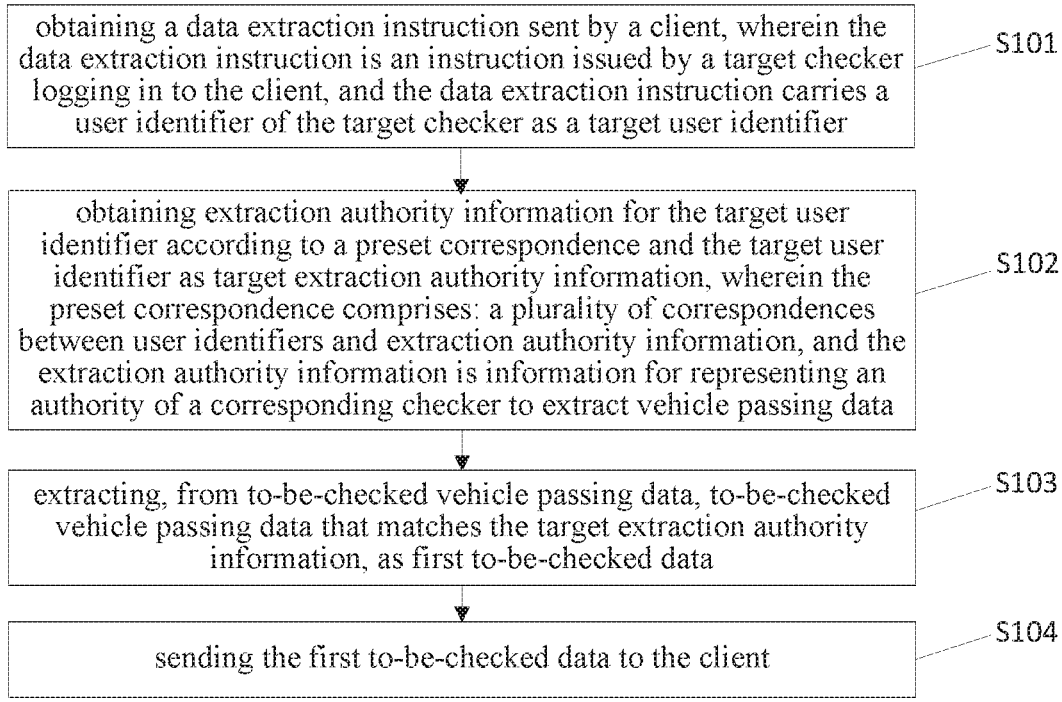
FIG. 1 is a schematic flowchart of a data extraction method according to an embodiment of the present application.

As shown in FIG. 1, an embodiment of the present application provides a data extraction method, which may include the following steps.

S101: obtaining a data extraction instruction sent by a client, wherein the data extraction instruction is an instruction issued by a target checker logging in to the client, and the data extraction instruction carries a user identifier of the target checker as a target user identifier.

It can be understood that the data extraction method according to the embodiment of the present application can be applied to a data analysis system. The data analysis system can obtain vehicle passing data, which is data identified from images and/or videos acquired by the image acquisition device.

The data analysis system may include a client and a server. The client is used to provide a checker with an interactive service with the server. For example, the client provides the checker with a page to log in to the server, with a service to extract data from the server, with a service that displays data extracted from the server, with a service to check the displayed data and upload a check result, and so on. The server can provide data and services for a checker logging in to the client. For example, the server may provide data for a checker in response to a data extraction instruction sent by the checker through the client; the server may also obtain a check result of the checker and provide subsequent services (such as storage and analysis).

In one implementation, the data analysis system may employ a front-end split architecture mode. In this case, the server may include a server for providing data and a server for providing services. It can be understood that the server for providing services can implement the interaction of the server (back end) for providing data and a client (front end). For example, the server for providing services may obtain data from the server for providing data in response to a data extraction instruction sent by a checker through the client, and provide the obtained data to the client. In another implementation, it is also possible that the server for providing data and the server for providing services are integrated in the same server.

The data analysis system may be deployed in a distributed manner to reduce the operational pressure of each device (including servers and clients) of the data analysis system.

The architecture of the data analysis system can be based on SOA (Service Oriented Ambiguity) to increase the number of sources of vehicle passing data, that is, to increase the number of sources of images and/or videos. The data analysis system can identify the vehicle passing data from the images and/or videos.

When the checker wants to check whether the vehicle passing data is violation data, the checker may first log in to the client and send a data extraction instruction to the server through the client. After obtaining the data extraction instruction sent by the client, the server determines the user identifier of the checker from the data extraction instruction. In the embodiment of the present application, the checker who sends the data extraction instruction to the server through the client may be referred to as a target checker. The user identifier carried in the data extraction instruction may be referred to as a target user identifier, that is, the user identifier of the target checker may be referred to as a target user identifier. It can be understood that a plurality of checkers may send data extraction instructions to the server through the client. Also, the server may simultaneously obtain one or more data extraction instructions, and may simultaneously respond to the obtained one or more data extraction instructions and perform subsequent data extraction processes.

In this case, a function button for triggering a data extraction function may be set in the client, and the checker may trigger the above function button to send a data extraction instruction to the server through the client.

The user identifier may be any information that can uniquely identify the checker. For example, it may be a login account for the checker to log in to the data analysis system. Of course, in order to ensure the security of the data analysis system and the data therein, when the checker logs in to the client by the login account, the client needs to verify the identity of the checker. Upon successful verification, the checker is allowed to log in to the client, that is, the user logs in to the data analysis system.

S102: obtaining extraction authority information for the target user identifier according to a preset correspondence and the target user identifier, as target extraction authority information, wherein the preset correspondence contains a plurality of correspondences between user identifiers and extraction authority information, and the extraction authority information is information for representing an authority of a corresponding checker to extract vehicle passing data.

In this step, after obtaining the data extraction instruction sent by the client and determining the target user identifier carried in the data extraction instruction, the server may match the target user identifier with each correspondence in the preset correspondence. When a correspondence containing the target user identifier is found, extraction authority information contained in the correspondence is used as the extraction authority information for the target user identifier, that is, the target extraction authority information.

It can be understood that the preset correspondence contains: a plurality of correspondences between user identifiers and extracted authority information, the preset correspondence may be stored in the server (for example, a server for providing data or a server for providing services), or may be stored in a storage device connected to the server. Extraction authority information for different user identifiers may be the same or different.

In an implementation, an administrator of the server may set authority information according to a policy of an area in which vehicle passing data is obtained and data attributes of the vehicle passing data, and set extraction authority information for each checker, that is, set a preset correspondence.

It can be understood that one or more pieces of authority information may be set for each user identifier. The administrator may enable one piece of authority information for each user identifier, and the enabled authority information can be used as the extraction authority information for the user identifier. For example, the authority information 1, authority information 2 and authority information 3 are set for the user identifier 1; the authority information 1, authority information 2 and authority information 4 are set for the user identifier 2; the authority information 1 is set for the user identifier 3. When the authority information 2 for the user identifier 1 is enabled, the extraction authority information for the user identifier 1 is the authority information 2. When the authority information 2 for the user identifier 1 is enabled, the authority information 2 for the user identifier 2 cannot be enabled, because the user identifier 2 also has available authority information 1 and authority information 4. In the case where the authority information 2 for the user identifier 1 is enabled, the authority information 1 or authority information 4 for the user identifier 2 may be enabled. When the authority information 1 for the user identifier 2 is enabled, the authority information 1 for the user identifier 3 can be enabled, because the user identifier 3 has no other available authority information except authority information 1.

In addition, the vehicle passing data may include information such as checkpoint identifier, acquisition time point, vehicle identifier, vehicle type, vehicle violation type, vehicle violation act, and vehicle violation location. For example, the vehicle passing data may be: checkpoint identifier: checkpoint identifier 9, acquisition time point: M h:N m:P s, Z day/Y month/X year, vehicle identifier: vehicle identifier 2, vehicle type: truck, vehicle violation type: red light violation, vehicle violation act: 8363 motor vehicle exceeds the speed limit by less than 50% and vehicle violation location: xx road, xx city. Data attributes of the vehicle passing data may include, but are not limited to, checkpoint identifier, vehicle identifier, vehicle type, vehicle violation type, vehicle violation act, time information, and vehicle violation location.

The authority information may define the authority of the corresponding checker to extract the vehicle passing data, and may include any combination of the data attributes such as checkpoint identifier, vehicle identifier, vehicle type, vehicle violation type, vehicle violation act, time information, and vehicle violation location. That is, the extraction authority information may include any combination of the data attributes such as checkpoint identifier, vehicle identifier, vehicle type, vehicle violation type, vehicle violation act, time information, and vehicle violation location. For example, the authority information may be: checkpoint identifier: checkpoint identifier 1 and checkpoint identifier 2, time information: Jul. 5, 2020-Jul. 20, 2020, vehicle type: truck, and vehicle violation type: red light violation.

S103: extracting, from the to-be-checked vehicle passing data, to-be-checked vehicle passing data that matches the target extraction authority information, as first to-be-checked data.

In this operation, the to-be-checked vehicle passing data may be stored on the server. Considering the limited storage space of the server, the to-be-checked vehicle passing data may also be stored in the storage device connected to the server.

After determining the target extraction authority information, the server may compare each to-be-checked vehicle passing data with the target extraction authority information. The server determines to-be-checked vehicle passing data matching the target extraction authority information from the to-be-checked vehicle passing data, and extracts it as the first to-be-checked vehicle passing data.

For example, the target extraction authority information may include checkpoint identifier: checkpoint identifier 1, vehicle violation type: speeding, reverse driving. In this case, the server may extract, from the to-be-checked vehicle passing data, data in which the checkpoint identifier is checkpoint identifier 1, and the vehicle violation type is speeding or reverse driving, as the first to-be-checked data.

S104: sending the first to-be-checked data to the client.

In this operation, after determining the first to-be-checked data, the server sends the determined first to-be-checked data to the client through the network. Subsequently, the client may receive and display the first to-be-checked data, and the checker logging in to the client can manually check the first to-be-checked data to determine whether the first to-be-checked data is violation data.

That is to say, the client may receive and display the first to-be-checked data, and the checker logging in to the client may perform manual check on each first to-be-checked data displayed on the client to determine whether the first to-be-checked data is violation data.

Subsequently, when the target checker corresponding to the target user identifier has an authority of delivering authority, the target checker may deliver the obtained first to-be-checked data to the next level of checker. The above "next level" is relative to the authority of delivering authority of the checker. For example, when the first to-be-checked data obtained by the target checker is: checkpoint identifier: checkpoint identifier 1, checkpoint identifier 2, checkpoint identifier 3 and checkpoint identifier 4, vehicle type: motorcycle, truck and bus, vehicle violation type: speeding, reverse driving, and when the target checker has the authority of delivering authority, the target checker may deliver the first to-be-checked data including different vehicle types to different checkers at the next level. For example, the target checker may deliver the first to-be-checked data in which the vehicle type is motorcycle to the next level of checker z and the first to-be-checked data in which the vehicle type is truck to the next level of checker x, and check the first to-be-checked data in which the vehicle type is bus.

In the embodiment of the present application, a correspondence between each user identifier and extraction authority information is pre-set, that is, a correspondence between each checker and extraction authority information is pre-set. After a data extraction instruction sent by a target checker logging in to a client through the client is obtained, target extraction authority information may be automatically determined according to the user identifier of the target checker, i.e., target user identifier, carried in the data extraction instruction, and to-be-checked vehicle passing data matching the target extraction authority information is extracted from the vehicle passing data and sent to the client. Throughout data extraction, only by triggering the client to send the data extraction instruction, the target checker can obtain the required vehicle passing data without other operations, thereby reducing the number of manual operations of the checker in data extraction. Further, this reduces the number of manual operations in data checking and improves data checking efficiency.

Moreover, in the embodiment of the present application, the data analysis system pre-sets the extraction authority information for the checker. The extraction authority information is information for representing the authority of the corresponding checker to extract the vehicle passing data. The checker can only extract vehicle passing data under his/her authority, avoiding the fraudulent behavior of the checker to a certain extent.

Figure 2:
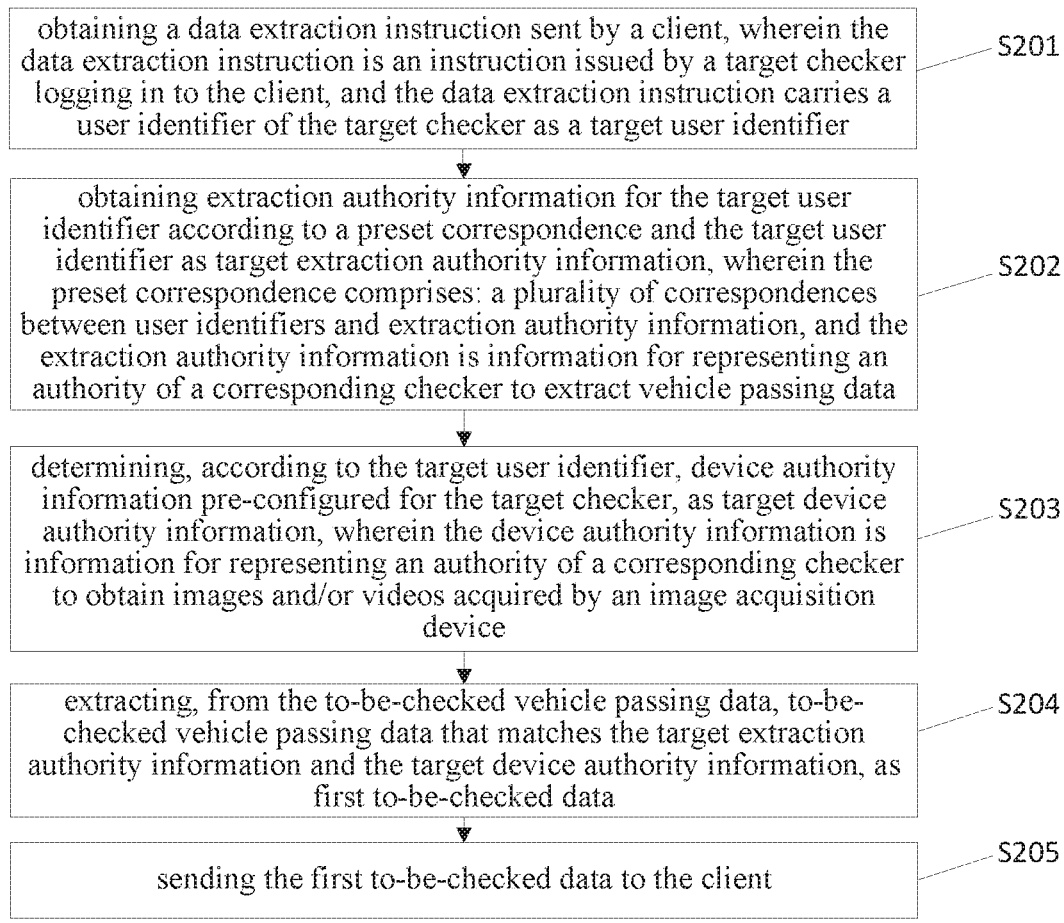
FIG. 2 is another schematic flowchart of a data extraction method according to an embodiment of the present application.

It can be understood that the checker should check vehicle passing data according to images and/or videos of the vehicle passing data, i.e., images and/or videos from which the vehicle passing data is recognized. When the checker obtains vehicle passing data but cannot obtain the images and/or videos of the vehicle passing data, the checker cannot check the vehicle passing data. In an implementation, as shown in FIG. 2, the method may include the following operations.

S201: obtaining a data extraction instruction sent by a client, wherein the data extraction instruction is an instruction issued by a target checker logging in to the client, and the data extraction instruction carries a user identifier of the target checker as a target user identifier.

S202: obtaining extraction authority information for the target user identifier according to a preset correspondence and the target user identifier, as target extraction authority information, wherein the preset correspondence includes a plurality of correspondences between user identifiers and extraction authority information, and the extraction authority information is information for representing an authority of a corresponding checker to extract vehicle passing data.

The above S201 is the same as S101 shown in FIG. 1, and the above S202 is the same as S102 shown in FIG. 1.

S203: determining, according to the target user identifier, device authority information pre-configured for the target checker, as target device authority information, wherein the device authority information is information for representing an authority of a corresponding checker to obtain images and/or videos acquired by an image acquisition device;

S204: extracting, from the to-be-checked vehicle passing data, to-be-checked vehicle passing data that matches the target extraction authority information and the target device authority information, as first to-be-checked data.

It can be understood that the checkpoint has a correspondence with the image acquisition device. When the checkpoint identifier is determined, the image acquisition device is determined.

The device authority information may be information for representing the authority of the checker to obtain images and/or videos acquired by the image acquisition device. When the target checker has the authority to extract certain to-be-checked vehicle passing data, and the authority to obtain images and/or videos for the to-be-checked vehicle passing data, he/she can check the to-be-checked vehicle passing data. In one implementation, in order to ensure the validity of the check of the to-be-checked vehicle passing data, the to-be-checked vehicle passing data that meets the target extraction authority information and the target device authority information is extracted, so as to avoid the problem that the target checker cannot check certain to-be-checked vehicle passing data after obtaining the to-be-checked vehicle passing data, resulting in invalidation of checking. The images and/or videos for the to-be-checked vehicle passing data indicate images and/or videos from which the data analysis system recognizes the vehicle passing data. When the target checker has the authority to obtain an image acquisition device that acquires the images and/or videos, the target checker has the authority to obtain the images and/or videos for the to-be-checked vehicle passing data.

For example, the target extraction authority information may include checkpoint identifier: checkpoint identifier 2 and checkpoint identifier 3; and vehicle violation type: speeding and reverse driving; the target device authority information may include checkpoint identifier 1 and checkpoint identifier 2. The above target extraction authority information indicates that the target checker has the authority to obtain to-be-checked vehicle passing data in which the checkpoint identifier is checkpoint identifier 2 or checkpoint identifier 3 and the vehicle violation type is speeding or reverse driving, and the target device authority information indicates that the target checker has the authority to obtain images and/or videos acquired by image acquisition devices for a checkpoint whose checkpoint identifier is checkpoint identifier 1 and a checkpoint whose checkpoint identifier is checkpoint identifier 2. The data, which matches the target extraction authority information and the target device authority information, extracted by the server from the vehicle passing data may include: to-be-checked vehicle passing data in which the checkpoint identifier is checkpoint identifier 2 and the vehicle violation type is speeding or reverse driving.

S205: sending the first to-be-checked data to the client.

Here, the above S205 is the same as S104 shown in FIG. 1.

In one case, the data analysis system may provide the target checker with an authority to extract to-be-checked vehicle passing data, but may not have authority information for the target checker, that is, extraction authority information. The extraction authority information for the target checker is the enabled authority information for the target checker. Such a target checker can have an authority to extract all to-be-checked vehicle passing data. In this case, such a target checker can directly extract to-be-checked vehicle passing data according to corresponding device authority information. Specifically, before obtaining extraction authority information for the target user identifier according to a preset correspondence and the target user identifier as target extraction authority information (S202), the method further includes:

determining, according to the preset correspondence and the target user identifier, whether a first correspondence including the target user identifier exists in the preset correspondence;

when the first correspondence exists, performing the step of obtaining extraction authority information for the target user identifier according to a preset correspondence and the target user identifier as target extraction authority information;

when the first correspondence does not exist, the method may further include:

extracting, from the to-be-checked vehicle passing data, to-be-checked vehicle passing data that matches the target device authority information, as a second to-be-checked data; and sending the second to-be-checked data to the client.

In an implementation, the to-be-checked vehicle passing data is generally time-sensitive. When the acquisition time of the to-be-checked vehicle passing data exceeds a preset time, the to-be-checked vehicle passing data may be considered as invalid data, that is, it is considered as non-violation data. The extraction of data may be performed in chronological order in which to-be-checked vehicle passing data is acquired. In this case, the to-be-checked vehicle passing data may be arranged in chronological order. In extracting data according to the target extraction authority information, the server may determine and extract the data according to the arranged to-be-checked vehicle passing data. In addition, in order to improve the checker's experience to a certain extent and further improve the efficiency of the checker's subsequent data checking, to-be-checked vehicle passing data including the same checkpoint identifier should be provided to the checker during a data extraction process.

In one case, to-be-checked vehicle passing data may be arranged in chronological order; each to-be-checked vehicle passing data includes a checkpoint identifier; the target extraction authority information includes at least: information defining that the target checker has an authority to extract to-be-checked vehicle passing data including a target checkpoint identifier.

Figure 3:
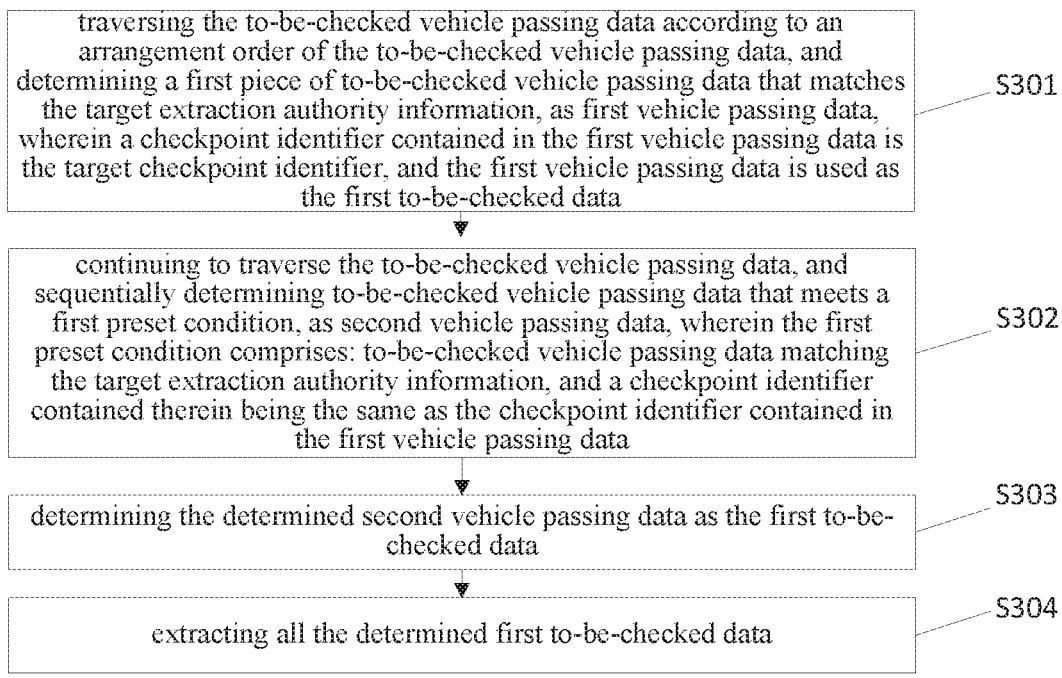
FIG. 3 is a schematic flowchart of determining first to-be-checked data.

As shown in FIG. 3, the extracting, from the to-be-checked vehicle passing data, vehicle passing data that matches the target extraction authority information, as first to-be-checked data (S103), may include:

S301: traversing the to-be-checked vehicle passing data according to the arrangement order of the to-be-checked vehicle passing data, and determining a first piece of to-be-checked vehicle passing data that matches the target extraction authority information, as first vehicle passing data, wherein a checkpoint identifier contained in the first vehicle passing data is the target checkpoint identifier, and the first vehicle passing data is used as the first to-be-checked data;

S302: continuing to traverse the to-be-checked vehicle passing data, and sequentially determining to-be-checked vehicle passing data that meets a first preset condition, as second vehicle passing data, wherein the first preset condition includes: to-be-checked vehicle passing data matching the target extraction authority information, and a checkpoint identifier contained therein being the same as the checkpoint identifier contained in the first vehicle passing data;

S303: determining the determined second vehicle passing data as the first to-be-checked data; and S304: extracting all the first to-be-checked data determined.

In the embodiment of the present application, in the above data extraction process, the first piece of to-be-checked vehicle passing data that matches the target extraction authority information is randomly generated, instead of being manually set by the checker. Therefore, the above data extraction process can avoid, to a certain extent, the checker's neglect of duty. That is, this data extraction process can avoid to a certain extent that the checker specifically extracts certain to-be-checked vehicle passing data, and directly determine the specifically extracted to-be-checked vehicle passing data as non-violation data.

For example, the above target extraction authority information includes: checkpoint identifier: checkpoint identifier 1, checkpoint identifier 2 and checkpoint identifier 3, vehicle type: car, vehicle violation type: parking violation and red light violation; the to-be-checked vehicle passing data is arranged in chronological order.

The server sequentially traverses each to-be-checked vehicle passing data according to the arrangement order of the to-be-checked vehicle passing data, and determines a first piece of to-be-checked vehicle passing data that matches the target extraction authority information, as the first vehicle passing data, and as the first to-be-checked data. That is, a first piece of to-be-checked vehicle passing data in which the checkpoint identifier is checkpoint identifier 1, checkpoint identifier 2 or checkpoint identifier 3, the vehicle type is car, and the vehicle violation type is parking violation or red light violation is determined as the first vehicle passing data. The checkpoint identifier included in the first vehicle passing data is checkpoint identifier 2.

At this time, the server continues to traverse the to-be-checked vehicle passing data, and sequentially determines to-be-checked vehicle passing data that meets a first preset condition, as a second vehicle passing data. That is, to-be-checked vehicle passing data in which the checkpoint identifier is checkpoint identifier 2, the vehicle type is car, and the vehicle violation type is parking violation or red light violation is determined as the second vehicle passing data. Subsequently, the vehicle passing data in the determined second vehicle passing data is determined as the first to-be-checked data. Then, all the first to-be-checked data determined are extracted to perform the subsequent data extraction operations.

After determining the second vehicle passing data from the to-be-checked vehicle passing data, all the vehicle passing data in the determined second vehicle passing data may be determined as the first to-be-checked data. Of course, considering the checking ability of each checker, a first preset number of pieces of firstly determined second vehicle passing data in the determined second vehicle passing data may also be determined as the first to-be-checked data. In an implementation, the determining the vehicle passing data in the determined second vehicle passing data as the first to-be-checked data (S303) may include:

determining all the determined second vehicle passing data as the first to-be-checked data; or determining the first preset number of pieces of firstly determined second vehicle passing data in the determined second vehicle passing data as the first to-be-checked data.

It can be understood that, in an implementation, after the first vehicle passing data is determined from the to-be-checked vehicle passing data, the number of pieces of second vehicle passing data, which meets the first preset condition, determined from the to-be-checked vehicle passing data, may be smaller than the first preset number. In this case, after determining the second vehicle passing data, it may be determined whether the number of pieces of the second vehicle passing data is not less than the first preset number. If so, a first preset number of pieces of firstly determined second vehicle passing data in the determined second vehicle passing data is determined as the first to-be-checked data. If not, the remaining first to-be-checked vehicle passing data continues to be determined. Specifically, before determining the first preset number of pieces of vehicle passing data in the determined second vehicle passing data as the first to-be-checked data, the method may further include:

determining whether the number of pieces of the determined second vehicle passing data is not less than the first preset number;

when the number of pieces of the determined second vehicle passing data is not less than the first preset number, performing the step of determining the first preset number of pieces of firstly determined second vehicle passing data in the determined second vehicle passing data as the first to-be-checked data;

when the number of pieces of the determined second vehicle passing data is less than the first preset number, the method may further include:

determining the remaining first to-be-checked data by using the following steps, until the number of pieces of all the determined first to-be-checked data equals to first preset number plus one, or, no to-be-checked vehicle passing data that matches the target extraction authority information exists in to-be-checked vehicle passing data other than the to-be-checked vehicle passing data that has been determined as the first to-be-checked data:

Step A: traversing the to-be-checked vehicle passing data other than the to-be-checked vehicle passing data that has been determined as the first to-be-checked data according to the arrangement order of the to-be-checked vehicle passing data, and determining to-be-checked vehicle passing data that first matches the target extraction authority information as a new first vehicle passing data, wherein a checkpoint identifier contained in the new first vehicle passing data is the target checkpoint identifier, and the new first vehicle passing data is used as the first to-be-checked data;

Step B: continuing to traverse the to-be-checked vehicle passing data other than the to-be-checked vehicle passing data that has been determined to be the first to-be-checked data, and sequentially determining to-be-checked vehicle passing data that meets a second preset condition as a new second vehicle passing data, wherein the second preset condition includes: to-be-checked vehicle passing data matching the target extraction authority information, and the checkpoint identifier contained therein being the same as the checkpoint identifier contained in the new first vehicle passing data;

Step C: determining whether the number of pieces of the determined new second vehicle passing data is not less than a first number, wherein the first number equals to the first preset number plus one and minus the number of pieces of the determined first to-be-checked data; and Step D: selecting a first number of pieces of firstly determined new second vehicle passing data in the determined new second vehicle passing data, as the first to-be-checked data, when the number of pieces of the determined new second vehicle passing data is not less than the first number; and returning to step A when the number of pieces of the determined new second vehicle passing data is less than the first number.

In the example, the target extraction authority information includes: checkpoint identifier: checkpoint identifier 1, checkpoint identifier 2 and checkpoint identifier 3, vehicle type: car, vehicle violation type: parking violation and red light violation; the to-be-checked vehicle passing data is arranged in chronological order; the first preset number is 19.

After determining the second vehicle passing data according to the above process, the server determines whether the number of pieces of the determined second vehicle passing data is not less than 19;

when the number is not less than 19, for example, the number of pieces of the determined second vehicle passing data is 20, the first 19 pieces of second vehicle passing data of the 20 pieces of determined second vehicle passing data is determined as first to-be-checked data;

when the number is less than 19, for example, the number of pieces of the determined second vehicle passing data is 10, the server continues to traverse other to-be-checked vehicle passing data other than the other to-be-checked vehicle passing data that has been determined as the first to-be-checked data according to the arrangement order of the to-be-checked vehicle passing data, and determines a first piece of to-be-checked vehicle passing data that matches the target extraction authority information as new first vehicle passing data. That is, a first piece of to-be-checked vehicle passing data in which the checkpoint identifier is checkpoint identifier 1, checkpoint identifier 2 or checkpoint identifier 3, the vehicle type is car, and the vehicle violation type is parking violation or red light violation is determined as the new first vehicle passing data. The checkpoint identifier contained in the new first vehicle passing data is checkpoint identifier 1.

At this time, the server continues to traverse other to-be-checked vehicle passing data other than the to-be-checked vehicle passing data that has been determined as the first to-be-checked data, and sequentially determine the to-be-checked vehicle passing data that meets a second preset condition, as new second vehicle passing dat. That is, to-be-checked vehicle passing data in which the checkpoint identifier is checkpoint identifier 1, the vehicle type is car, and the vehicle violation type is parking violation or red light violation, is determined as the new second vehicle passing data.

The server determines whether the number of pieces of the determined new second vehicle passing data is not less than the first number 8 (19+1−(1+10+1), i.e., the first preset number plus one and minus the number of pieces of the determined first to-be-checked data).

The first 8 pieces of vehicle passing data in the new second vehicle passing data is selected as the first to-be-checked data when the number of pieces of the determined new second vehicle passing data is not less than 8.

When the number of pieces of the determined new second vehicle passing data is less than 8, the server returns to the operation of traversing other to-be-checked vehicle passing data other than the to-be-checked vehicle passing data that has been determined as the first to-be-checked data, according to the arrangement order of the to-be-checked vehicle passing data, and determining a first piece of to-be-checked vehicle passing data that matches the target extraction authority information, as new first vehicle passing data.

When the number of pieces of all the determined first to-be-checked data equals to first preset number plus one (20), or, no to-be-checked vehicle passing data that matches the target extraction authority information exists in to-be-checked vehicle passing data other than the to-be-checked vehicle passing data that has been determined as the first to-be-checked data, all the determined first to-be-checked data is extracted to perform subsequent data extraction operations.

In another case, the to-be-checked vehicle passing data may be arranged in chronological order; each piece of to-be-checked vehicle passing data includes a checkpoint identifier; the target extraction authority information includes at least: information defining that the target checker has the authority to extract the to-be-checked vehicle passing data including a target checkpoint identifier.

The extracting, from the to-be-checked vehicle passing data, to-be-checked vehicle passing data that matches the target extraction authority information, as first to-be-checked data (S103) may include:

traversing the to-be-checked vehicle passing data according to the arrangement order of the data, and determining and extracting a first piece of to-be-checked vehicle passing data that matches the target extraction authority information, as third vehicle passing data, wherein a checkpoint identifier contained in the third vehicle passing data is the target checkpoint identifier, and the third vehicle passing data is used as the first to-be-checked data;

continuing to traverse the to-be-checked vehicle passing data, and sequentially determining a second preset number of pieces of to-be-checked vehicle passing data that firstly meets a third preset condition, as first to-be-checked data, wherein the third preset condition includes to-be-checked vehicle passing data matching the target extraction authority information, and a checkpoint identifier contained therein being the same as the checkpoint identifier contained in the third vehicle passing data:

extracting all the determined first to-be-checked data.

For example, the target extraction authority information includes: checkpoint identifier: checkpoint identifier 4, checkpoint identifier 5 and checkpoint identifier 6, vehicle type: car, vehicle violation type: parking violation and red light violation; the to-be-checked vehicle passing data is arranged in chronological order; the second preset number is 19.

The server sequentially traverses each piece of to-be-checked vehicle passing data according to the arrangement order of the data, and determines a first piece of to-be-checked vehicle passing data that matches the target extraction authority information, as third vehicle passing data. That is, a first piece of to-be-checked vehicle passing data in which the checkpoint identifier is checkpoint identifier 4, checkpoint identifier 5 or checkpoint identifier 6, the vehicle type is car, and the vehicle violation type is parking violation or red light violation, is determined as the third vehicle passing data. The checkpoint identifier contained in the third vehicle passing data is checkpoint identifier 4. At this time, the server continues to traverse the to-be-checked vehicle passing data to sequentially determine a first second number of pieces of to-be-checked vehicle passing data that meets the third preset condition as first to-be-checked data. That is, the first 19 pieces of data in which the checkpoint identifier is checkpoint identifier 4, the vehicle type is car, and the vehicle violation type is parking violation or red light violation is sequentially determined as the first to-be-checked data. Then, all the determined first to-be-checked data is extracted to perform subsequent data extraction operations.

It can be understood that, in determining the first to-be-checked data, the server can count the number of pieces of the first to-be-checked data from 0, increase the number by 1 whenever one piece of first to-be-checked data is determined, and end the traversing of to-be-checked vehicle passing data until the number reaches a second preset number (for example, 19). Then all the determined first to-be-checked data is extracted to perform subsequent data extraction operations.

It can be understood that the above is an example that the number of piece of to-be-checked vehicle passing data meeting the third preset condition in the to-be-checked vehicle passing data is greater than or equal to the second preset number. In an example that the number of pieces of to-be-checked vehicle passing data meeting the third preset condition in the to-be-checked vehicle passing data is less than the second preset number, the remaining first to-be-checked data may continue to be determined until the number of pieces of all the determined first to-be-checked data equals to second preset number plus one, or, no to-be-checked vehicle passing data that matches the target extraction authority information in to-be-checked vehicle passing data other than the to-be-checked vehicle passing data that has been determined as the first to-be-checked data.

Specifically, step a: traversing to-be-checked vehicle passing data other than the to-be-checked vehicle passing data that has been determined as the first to-be-checked data according to the arrangement order of the to-be-checked vehicle passing data, and determining a first piece of to-be-checked vehicle passing data that matches the target extraction authority information, as new third vehicle passing data, wherein a checkpoint identifier contained in the new third vehicle passing data is the target checkpoint identifier, and the new third vehicle passing data is used as the first to-be-checked data;

step b: traversing to-be-checked vehicle passing data other than the to-be-checked vehicle passing data that has been determined as the first to-be-checked data, and sequentially determining to-be-checked vehicle passing data that meets a fourth preset condition, as four vehicle passing data, wherein the four preset condition includes: to-be-checked vehicle passing data matching the target extraction authority information, and a checkpoint identifier therein is the same as the checkpoint identifier contained in the new third vehicle passing data. In the process of sequentially determining to-be-checked vehicle passing data that meets a fourth preset condition, the number of pieces of the determined data that meets the fourth preset condition is recorded. When the number reaches a second number, the traversing is stopped. When the traversing of to-be-checked vehicle passing data other than the to-be-checked vehicle passing data that has been determined as the first to-be-checked data is completed, and the number does not reach the second number, it is returned to step a. The second number equals to the second preset number plus one and minus the number of pieces of the determined first to-be-checked data.

When the traversing of to-be-checked vehicle passing data is completed once by the server, the number of pieces of the determined fourth vehicle passing data is 10, which is less than the second preset number 19.

At this time, the server traverses to-be-checked vehicle passing data other than the to-be-checked vehicle passing data that has been determined as the first to-be-checked data according to the arrangement order of the to-be-checked vehicle passing data, and determines a first piece of vehicle passing data that matches the target extraction authority information, as new third vehicle passing data. That is, a first piece of vehicle passing data in which the checkpoint identifier is checkpoint identifier 5 or checkpoint identifier 6, the vehicle type is car, and the vehicle violation type is parking violation or red light violation, is determined as the new third vehicle passing data. The checkpoint identifier contained in the new third vehicle passing data is checkpoint identifier 6.

The server continues to traverse the to-be-checked vehicle passing data, and sequentially determines the data that meets the fourth preset condition, as new fourth vehicle passing data. The server stops the traversing of the to-be-checked vehicle passing data when determining 8 pieces of new fourth vehicle passing data.

In an implementation, before extracting, from the to-be-checked vehicle passing data, to-be-checked vehicle passing data that matches the target extraction authority information, as a first to-be-checked data, the method may further include determining the to-be-checked vehicle passing data, which may include:

extracting, from vehicle passing data, vehicle passing data that meets a preset condition, and caching the extracted vehicle passing data in a preset data pool as the to-be-checked vehicle passing data;

wherein the vehicle passing data that meets a preset condition is: vehicle passing data that meets extraction authority information for any user identifier for the preset data pool, and does not meet a preset data filtering condition, wherein the user identifier is: a user identifier in the preset correspondence.

It can be understood that vehicle passing data that meets the preset condition is extracted from the vehicle passing data and cached in a preset data pool, which can avoid the operation of the original vehicle passing data and guarantee the safety of the original vehicle passing data to a certain extent. Moreover, only the vehicle passing data that meets the preset condition is cached in the preset data pool, which reduces time consumed by data extraction during data checking to a certain extent. The above-mentioned vehicle passing data may be all the vehicle passing data that can be obtained from the server.

Extracting vehicle passing data that meets the preset condition from the vehicle passing data may include: filtering out vehicle passing data that meets the preset data filtering condition from the vehicle passing data to obtain the remaining vehicle passing data, and then determining and extracting vehicle passing data that meets extraction authority information for any user identifier for the preset data pool from the remaining vehicle passing data. It may further includes: determining, from the vehicle passing data, vehicle passing data that meets the extraction authority information for any user identifier for the preset data pool, and then filtering out and extracting vehicle data that meets the preset data filtering condition.

In an implementation, vehicle passing data in some special conditions need not be checked, that is, the vehicle passing data can be confirmed as invalid data. The above "invalid" may identify that the vehicle passing data is confirmed as non-violation data. The vehicle passing data in the special conditions includes, but is not limited to, vehicle passing data acquired by a faulty image acquisition device, and vehicle passing data acquired by an image acquisition device for a road being repaired and so on.

In the embodiment of the present application, vehicle passing data in special conditions may be filtered out in the vehicle passing data according to a preset data filtering condition. It can avoid that there is vehicle passing data in the special conditions in the first to-be-checked data obtained by the checker. Further, it can be avoided that the checker's checked result is in error.

For example, a checkpoint identifier corresponding to an image acquisition device for a road being repaired and so on is checkpoint identifier 4, an image acquisition device for a checkpoint with checkpoint identifier 5 is faulty, and user identifiers for the preset data pool are user identifier 1, user identifier 2, and user identifier 3, respectively; extraction authority information for the user identifier 1 is: checkpoint identifier: checkpoint identifier 5 and checkpoint identifier 6, vehicle type: car, vehicle violation type: red light violation; extraction authority information for the user identifier 2 is: checkpoint identifier: checkpoint identifier 7 and checkpoint identifier 8, vehicle type: truck, vehicle violation type: red light violation; extraction authority information for the user identifier 3 is: checkpoint identifier: checkpoint identifier 5 and checkpoint identifier 6, vehicle type: bus.

The server extracts, from the vehicle passing data, vehicle passing data that meets a preset condition, and caches the extracted vehicle passing data in a preset data pool as to-be-checked vehicle passing data. That is, the server filters out from the vehicle passing data, vehicle passing data in which the checkpoint identifier is checkpoint identifier 4 or checkpoint identifier 5 to obtain the remaining vehicle passing data, and then determines and extracts from the remaining vehicle passing data, vehicle passing data in which the checkpoint identifier is checkpoint identifier 6, the vehicle type is car, and the vehicle violation type is red light violation, vehicle passing data in which the checkpoint identifier is checkpoint identifier 7 or 8, the vehicle type is truck, and the vehicle violation type is red light violation, and vehicle passing data in which the checkpoint identifier is checkpoint identifier 6 and the vehicle type is bus.

In an implementation, the to-be-checked vehicle passing data in the preset data pool may be periodically updated. That is, vehicle passing data that meets the preset condition may be periodically extracted from the vehicle passing data, and the extracted data is cached in the preset data pool as the to-be-checked vehicle passing data. Alternatively, it is also possible to update the to-be-checked vehicle passing data in the preset data pool whenever the preset condition is modified.

In an implementation, after sending the first to-be-checked data to the client (S104), the method may further include:

receiving data invalidation information fed back by the client, wherein the data invalidation information is: information that is fed back by the client for the to-be-checked first data when the checker logging in to the client determines that the first to-be-checked data is non-violation data;

counting and storing the number of pieces of the received data invalidation information according to the user identifier of the checker logging in to the client; and counting and storing the number of pieces of the received data invalidation information according to a checkpoint identifier of each piece of first to-be-checked data determined as non-violation data.

It can be understood that after receiving the data invalidation information fed back by the client, the server can count and store the number of pieces of the received data invalidation information according to the user identifier of the checker logging in to the client. When the counted number exceeds a preset threshold, the server may determine that the result of the first to-be-checked data checked by the checker corresponding to the user identifier may have a problem. The server may warn the checker corresponding to the user identifier, and the first to-be-checked checked by the checker corresponding to the user identifier may be checked again. When the server counts and stores the number of pieces of the received data invalidation information according to the checkpoint identifier of each piece of first to-be-checked data that is determined to be non-violation data, and when the counted number exceeds a preset threshold, it is possible to determine that the image acquisition device for the checkpoint with the checkpoint identifier may be faulty. In the process of extracting, from the vehicle passing data, vehicle passing data that meets the preset condition, vehicle passing data including the above checkpoint identifier is automatically filtered out.

In one case, the server may also receive data validation information fed back by the client. The data validation information is: information that is fed back by the client for the first to-be-checked data when the checker logging in to the client determines that the first to-be-checked data is violation data. After receiving the data validation information or the data invalidation information fed back by the client, the server may set a check mark for the to-be-checked vehicle passing data corresponding to the data valid information or the data invalid information. The check mark for the to-be-checked vehicle passing data corresponding to the data valid information may be: a preset violation data mark. The check mark for the to-be-checked vehicle passing data corresponding to the data invalid information may be: a preset non-violation data mark. This can avoid that the to-be-checked vehicle passing data which had been checked is repeatedly extracted and then repeatedly checked.

In an implementation, in order to prevent the to-be-checked vehicle passing data from being extracted by an checker (i.e., being checked by an checker), and then being extracted by other checkers (i.e., being checked by other checkers), after the to-be-checked vehicle passing data is extracted, a preset extracted mark may be set for each piece of extracted to-be-checked vehicle passing data, such that the extracted data cannot be extracted again. In this way, the waste of human resources can be avoided to a certain extent. Specifically, before sending the first to-be-checked data to the client (S104), the method may further include:

setting a preset extracted mark for each piece of first to-be-checked data, so that a checker other than the target checker cannot extract the first to-be-checked data.

Figure 4:
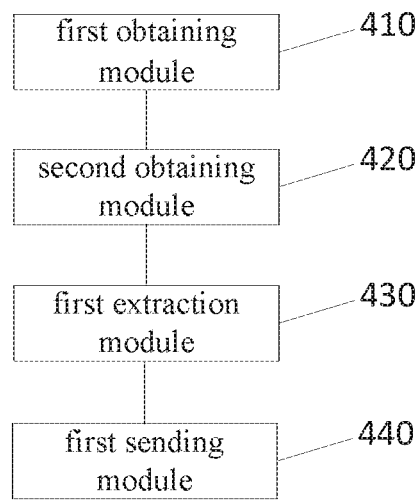
FIG. 4 is a schematic structural diagram of a data extraction apparatus according to an embodiment of the present application.

Correspondence to the foregoing method embodiments, an embodiment of the present application further provides a data extraction apparatus. As shown in FIG. 4, the apparatus may include:

a first obtaining module 410, configured for obtaining a data extraction instruction sent by a client, wherein the data extraction instruction is an instruction issued by a target checker logging in to the client, and the data extraction instruction carries a user identifier of the target checker as a target user identifier;

a second obtaining module 420, configured for obtaining extraction authority information for the target user identifier according to a preset correspondence and the target user identifier as target extraction authority information, wherein the preset correspondence includes: a plurality of correspondences between user identifiers and extraction authority information, and the extraction authority information is information for representing an authority of a corresponding checker to extract vehicle passing data;

a first extraction module 430, configured for extracting, from to-be-checked vehicle passing data, to-be-checked vehicle passing data that matches the target extraction authority information, as first to-be-checked data; and a first sending module 440, configured for sending the first to-be-checked data to the client.

In the embodiments of the present application, a correspondence between each user identifier and extraction authority information is pre-set, that is, a correspondence between each checker and extraction authority information is pre-set. After a data extraction instruction sent by a target checker logging in to a client through the client is obtained, target extraction authority information may be automatically determined according to a user identifier of the target checker, i.e., target user identifier, carried in the data extraction instruction, and to-be-checked vehicle passing data matching the target extraction authority information is extracted from the to-be-checked vehicle passing data and sent to the client. Throughout data extraction, only by triggering the client to send the data extraction instruction, the target checker can obtain the required vehicle passing data without other operations, thereby reducing the number of manual operations of the checker in data extraction. This further reduces the number of manual operations in data checking and improves data checking efficiency.

In an implementation, the apparatus further includes: a first determination module.

The first determination module is configured for before to-be-checked vehicle passing data that matches the target extraction authority information is extracted from to-be-checked vehicle passing data, determining, according to the target user identifier, device authority information pre-configured for the target checker, as target device authority information, wherein the device authority information is information for representing an authority of a corresponding checker to obtain images and/or videos acquired by an image acquisition device.

The first extraction module 430 is specifically configured for:

extracting, from the to-be-checked vehicle passing data, to-be-checked vehicle passing data that matches the target extraction authority information and the target device authority information, as first to-be-checked data.

In an implementation, the apparatus may further include a judgment module, a second extraction module and a second sending module.

The judgment module is configured for before the extraction authority information for the target user identifier is obtained according to the preset correspondence and the target user identifier as the target extraction authority information, determining, according to the preset correspondence and the target user identifier, whether a first correspondence including the target user identifier exists in the preset correspondence.

The second obtaining module is triggered when the first correspondence exists; and the second extraction module is triggered when the first correspondence does not exist.

The second extraction module is configured for extracting, from the to-be-checked vehicle passing data, to-be-checked vehicle passing data that matches the target device authority information, as second to-be-checked data.

The second sending module is configured for sending the second to-be-checked data to the client.

In an implementation, the to-be-checked vehicle passing data is arranged in chronological order; each piece of to-be-checked vehicle passing data contains a checkpoint identifier; the target extraction authority information includes at least information defining that the target checker has an authority to extract to-be-checked vehicle passing data containing the target checkpoint identifier.

The first extraction module 430 includes a first traversal determination unit, a second traversal determination unit, a first determination unit, and an extraction unit.

The first traversal determination unit is configured for traversing the to-be-checked vehicle passing data according to an arrangement order of the to-be-checked vehicle passing data, and determining a first piece of to-be-checked vehicle passing data that matches the target extraction authority information, as first vehicle passing data, wherein a checkpoint identifier contained in the first vehicle passing data is the target checkpoint identifier, and the first vehicle passing data is used as the first to-be-checked data.

The second traversal determination unit is configured for continuing to traverse the to-be-checked vehicle passing data, and sequentially determining to-be-checked vehicle passing data that meets a first preset condition, as second vehicle passing data, wherein the first preset condition includes: to-be-checked vehicle passing data matching the target extraction authority information, and a checkpoint identifier contained therein being the same as the checkpoint identifier contained in the first vehicle passing data.

The first determination unit is configured for determining the determined second vehicle passing data as the first to-be-checked data.

The extraction unit is configured for extracting all the determined first to-be-checked data.

In an implementation, the first determination unit includes a first determination sub-module or a second determination sub-module.

The first determination sub-module is configured for determining all the determined second vehicle passing data as the first to-be-checked data.

The second determination sub-module is configured for determining a first preset number of pieces of firstly determined second vehicle passing data in the determined second vehicle passing data, as the first to-be-checked data.

In an implementation, the first determination unit further includes a judgment sub-module and a third determination sub-module.

The judgment sub-module is configured for before the first preset number of pieces of firstly determined second vehicle passing data in the determined second vehicle passing data is determined as the first to-be-checked data, determining whether the number of pieces of the determined second vehicle passing data is not less than the first preset number.

The second determination sub-module is triggered when the number of pieces of the determined second vehicle passing data is not less than the first preset number; and the third determination sub-module is triggered when the number of pieces of the determined second vehicle passing data is less than the first preset number.

The third determination sub-module is configured for determining the remaining first to-be-checked data until the number of pieces of all the determined first to-be-checked data equals to the first preset number plus one, or, no to-be-checked vehicle passing data that matches the target extraction authority information exists in to-be-checked vehicle passing data other than the to-be-checked vehicle passing data that has been determined as the first to-be-checked data. The third determination sub-module may include a first traversal determination subunit, a second traversal determination subunit, a judgment subunit, and a selecting subunit.

The first traversal determination subunit is configured for traversing to-be-checked vehicle passing data other than the to-be-checked vehicle passing data that has been determined as the first to-be-checked data according to the arrangement order of the to-be-checked vehicle passing data, and determining a first piece of to-be-checked vehicle passing data that matches the target extraction authority information, as new first vehicle passing data, wherein a checkpoint identifier contained in the new first vehicle passing data is the target checkpoint identifier, and the new first vehicle passing data is used as the first to-be-checked data.

The second traversal determination subunit is configured for continuing to traverse to-be-checked vehicle passing data other than the to-be-checked vehicle passing data that has been determined as the first to-be-checked data, and sequentially determining to-be-checked vehicle passing data that meets a second preset condition, as new second vehicle passing data, wherein the second preset condition includes: to-be-checked vehicle passing data matching the target extraction authority information, and a checkpoint identifier contained therein being the same as the checkpoint identifier contained in the new first vehicle passing data.

The judgment subunit is configured for determining whether the number of pieces of the determined new second vehicle passing data is not less than a first number, wherein the first number equals to the first preset number plus one and minus the number of pieces of the determined first to-be-checked data. The selecting subunit is triggered when the number of pieces of the determined new second vehicle passing data is not less than the first number; and the first traversal determination subunit is triggered when the number of pieces of the determined new second vehicle passing data is less than the first number.

The selecting subunit is configured for selecting a first number of pieces of firstly determined new second vehicle passing data in the determined new second vehicle passing data as the first to-be-checked data.

In an implementation, the to-be-checked vehicle passing data is arranged in chronological order; each piece of to-be-checked vehicle passing data contains a checkpoint identifier; the target extraction authority information includes at least: information defining that the target checker has an authority to extract to-be-checked vehicle passing data containing the target checkpoint identifier.

The first extraction module 430 is specifically configured for: traversing the to-be-checked vehicle passing data according to the arrangement order of the to-be-checked vehicle passing data, and determining a first piece of to-be-checked vehicle passing data that matches the target extraction authority information, as third vehicle passing data, wherein a checkpoint identifier contained in the third vehicle passing data is the target checkpoint identifier, and the third vehicle passing data is used as the first to-be-checked data;

continuing to traverse the to-be-checked vehicle passing data, and sequentially determining a second preset number of to-be-checked vehicle passing data that firstly meets a third preset condition, as the first to-be-checked data, wherein the third preset condition includes: to-be-checked vehicle passing data matching the target extraction authority information, and a checkpoint identifier contained therein being the same as the checkpoint identifier contained in the third vehicle passing data; and extracting all the determined first to-be-checked data.

In an implementation, the apparatus further includes:

a second determination module, configured for before to-be-checked vehicle passing data that matches the target extraction authority information is extracted from the to-be-checked vehicle passing data, as first to-be-checked data, determining the to-be-checked vehicle passing data, wherein the second determination module is further configured for:

extracting, from vehicle passing data, vehicle passing data that meets a preset condition, and caching the extracted vehicle passing data in a preset data pool as the to-be-checked vehicle passing data;

wherein the vehicle passing data that meets the preset condition is vehicle passing data that meets extraction authority information for any user identifier for the preset data pool, and does not meet a preset data filtering condition, wherein the user identifier is a user identifier in the preset correspondence.

In an implementation, the apparatus further includes a receiving module, a first counting and storing module, and a second counting and storing module.

The receiving module is configured for after the first to-be-checked data is sent to the client, receiving data invalidation information fed back by the client, wherein the data invalidation information is information that is fed back by the client for first to-be-checked data when the checker logging in to the client determines that this first to-be-checked data is non-violation data.

The first counting and storing module is configured for counting and storing the number of pieces of the received data invalidation information according to the user identifier of the checker logging in to the client.

The second counting and storing module is configured for counting and storing the number of pieces of the received data invalidation information according to a checkpoint identifier of each piece of first to-be-checked vehicle passing data that is determined as non-violation data.

In an implementation, the apparatus further includes: a marking module.

The marking module is configured for before the first to-be-checked data is sent to the client, setting a preset extracted mark for each piece of first to-be-checked data, so that a checker other than the target checker cannot extract the first to-be-checked data.

Figure 5:
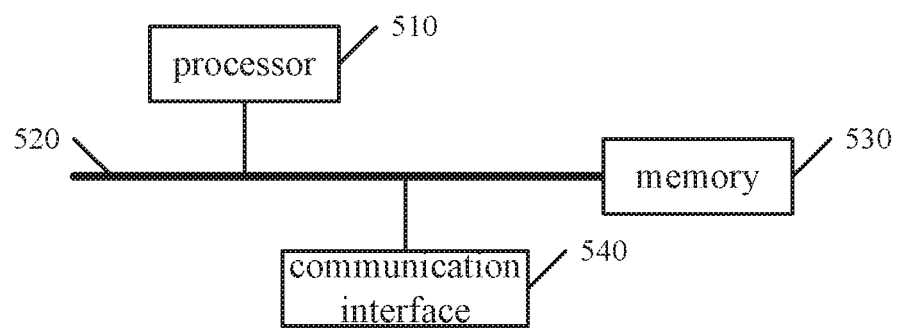
FIG. 5 is a schematic structural diagram of an electronic device according to an embodiment of the present application.

Correspondence to the above method embodiments, as shown in FIG. 5, an embodiment of the present application further discloses an electronic device. the device includes a processor 510, a communication interface 520, a memory 530, and a communication bus 540. The processor 510, the communication interface 520, and the memory 530 communicate with each other through the communication bus 540.

The memory 530 is configured for storing a computer program;

The processor 510 is configured to implement the data extraction method according to any one of the embodiments of the present invention when executing the computer program stored in the memory 530, wherein the data extraction method includes:

obtaining a data extraction instruction sent by a client, wherein the data extraction instruction is an instruction issued by a target checker logging in to the client, and the data extraction instruction carries a user identifier of the target checker as a target user identifier;

obtaining extraction authority information for the target user identifier according to a preset correspondence and the target user identifier as target extraction authority information, wherein the preset correspondence includes: a plurality of correspondences between user identifiers and extraction authority information, and the extraction authority information is information for representing an authority of a corresponding checker to extract vehicle passing data;

extracting, from to-be-checked vehicle passing data, to-be-checked vehicle passing data that matches the target extraction authority information, as first to-be-checked data; and sending the first to-be-checked data to the client.

In the embodiments of the present application, a correspondence between each user identifier and extraction authority information is pre-set, that is, a correspondence between each checker and extraction authority information is pre-set. After a data extraction instruction sent by a target checker logging in to a client through the client is obtained, target extraction authority information may be automatically determined according to a user identifier of the target checker, i.e., target user identifier, carried in the data extraction instruction, and to-be-checked vehicle passing data matching the target extraction authority information is extracted from the to-be-checked vehicle passing data and sent to the client. Throughout data extraction, only by triggering the client to send the data extraction instruction, the target checker can obtain the required vehicle passing data without other operations, thereby reducing the number of manual operations of the checker in data extraction. This further reduces the number of manual operations in data checking and improves data checking efficiency.

In an implementation, before extracting, from to-be-checked vehicle passing data, to-be-checked vehicle passing data that matches the target extraction authority information, as first to-be-checked data, the method further includes:

determining, according to the target user identifier, device authority information pre-configured for the target checker, as target device authority information, wherein the device authority information is information for representing an authority of a corresponding checker to obtain images and/or videos acquired by an image acquisition device; and the step of extracting, from to-be-checked vehicle passing data, to-be-checked vehicle passing data that matches the target extraction authority information, as first to-be-checked data, includes:

extracting, from the to-be-checked vehicle passing data, to-be-checked vehicle passing data that matches the target extraction authority information and the target device authority information, as first to-be-checked data.

In an implementation, before obtaining extraction authority information for the target user identifier according to a preset correspondence and the target user identifier as target extraction authority information, the method further includes:

determining, according to the preset correspondence and the target user identifier, whether a first correspondence including the target user identifier exists in the preset correspondence;

when the first correspondence exists, performing the step of obtaining extraction authority information for the target user identifier according to a preset correspondence and the target user identifier as target extraction authority information; and when the first correspondence does not exist, the method further includes:

extracting, from the to-be-checked vehicle passing data, to-be-checked vehicle passing data that matches the target device authority information, as second to-be-checked data; and sending the second to-be-checked data to the client.

In an implementation, the to-be-checked vehicle passing data is arranged in chronological order; each piece of to-be-checked vehicle passing data contains a checkpoint identifier; the target extraction authority information includes at least information defining that the target checker has an authority to extract to-be-checked vehicle passing data containing the target checkpoint identifier; and the step of extracting, from to-be-checked vehicle passing data, to-be-checked vehicle passing data that matches the target extraction authority information, as first to-be-checked data, includes:

traversing the to-be-checked vehicle passing data according to an arrangement order of the to-be-checked vehicle passing data, and determining a first piece of to-be-checked vehicle passing data that matches the target extraction authority information, as first vehicle passing data, wherein a checkpoint identifier contained in the first vehicle passing data is the target checkpoint identifier, and the first vehicle passing data is used as the first to-be-checked data;

continuing to traverse the to-be-checked vehicle passing data, and sequentially determining to-be-checked vehicle passing data that meets a first preset condition, as second vehicle passing data, wherein the first preset condition includes: to-be-checked vehicle passing data matching the target extraction authority information, and a checkpoint identifier contained therein being the same as the checkpoint identifier contained in the first vehicle passing data;

determining the determined second vehicle passing data as the first to-be-checked data; and extracting all the determined first to-be-checked data.

In an implementation, determining the determined second vehicle passing data as the first to-be-checked data includes:

determining all the determined second vehicle passing data as the first to-be-checked data; or determining a first preset number of pieces of firstly determined second vehicle passing data in the determined second vehicle passing data, as the first to-be-checked data.

In an implementation, before determining and extracting the first preset number of pieces of firstly determined second vehicle passing data in the determined second vehicle passing data, as the first to-be-checked data, the method further includes:

determining whether the number of pieces of the determined second vehicle passing data is not less than the first preset number;

when the number of pieces of the determined second vehicle passing data is not less than the first preset number, performing the step of determining the first preset number of pieces of firstly determined second vehicle passing data in the determined second vehicle passing data, as the first to-be-checked data;

when the number of pieces of the determined second vehicle passing data is less than the first preset number, the method further includes:

determining the remaining first to-be-checked data by the following steps until the number of pieces of all the determined first to-be-checked data equals to the first preset number plus one, or, no to-be-checked vehicle passing data that matches the target extraction authority information exists in to-be-checked vehicle passing data other than the to-be-checked vehicle passing data that has been determined as the first to-be-checked data:

Step A: traversing to-be-checked vehicle passing data other than the to-be-checked vehicle passing data that has been determined as the first to-be-checked data according to the arrangement order of the to-be-checked vehicle passing data, and determining a first piece of to-be-checked vehicle passing data that matches the target extraction authority information, as new first vehicle passing data, wherein a checkpoint identifier contained in the new first vehicle passing data is the target checkpoint identifier, and the new first vehicle passing data is used as the first to-be-checked data;

Step B: continuing to traverse to-be-checked vehicle passing data other than the to-be-checked vehicle passing data that has been determined as the first to-be-checked data, and sequentially determining to-be-checked vehicle passing data that meets a second preset condition, as new second vehicle passing data, wherein the second preset condition includes: to-be-checked vehicle passing data matching the target extraction authority information, and a checkpoint identifier contained therein being the same as the checkpoint identifier contained in the new first vehicle passing data;

Step C: determining whether the number of pieces of the determined new second vehicle passing data is not less than a first number, wherein the first number equals to the first preset number plus one and minus the number of pieces of the determined first to-be-checked data; and Step D: selecting a first number of pieces of firstly determined new second vehicle passing data in the determined new second vehicle passing data as the first to-be-checked data, when the number of pieces of the determined new second vehicle passing data is not less than the first number; and returning to step A when the number of pieces of the determined new second vehicle passing data is less than the first number.

In an implementation, the to-be-checked vehicle passing data is arranged in chronological order; each piece of to-be-checked vehicle passing data contains a checkpoint identifier; the target extraction authority information includes at least: information defining that the target checker has an authority to extract to-be-checked vehicle passing data containing the target checkpoint identifier;

the step of extracting, from to-be-checked vehicle passing data, to-be-checked vehicle passing data that matches the target extraction authority information, as first to-be-checked data, includes:

traversing the to-be-checked vehicle passing data according to the arrangement order of the to-be-checked vehicle passing data, and determining a first piece of to-be-checked vehicle passing data that matches the target extraction authority information, as third vehicle passing data, wherein a checkpoint identifier contained in the third vehicle passing data is the target checkpoint identifier, and the third vehicle passing data is used as the first to-be-checked data;

continuing to traverse the to-be-checked vehicle passing data, and sequentially determining a second preset number of to-be-checked vehicle passing data that firstly meets a third preset condition, as the first to-be-checked data, wherein the third preset condition includes: to-be-checked vehicle passing data matching the target extraction authority information, and a checkpoint identifier contained therein being the same as the checkpoint identifier contained in the third vehicle passing data; and extracting all the determined first to-be-checked data.

In an implementation, before extracting, from the to-be-checked vehicle passing data, to-be-checked vehicle passing data that matches the target extraction authority information, as first to-be-checked data, the method further includes determining the to-be-checked vehicle passing data, including:

extracting, from vehicle passing data, vehicle passing data that meets a preset condition, and caching the extracted vehicle passing data in a preset data pool as the to-be-checked vehicle passing data;

wherein the vehicle passing data that meets the preset condition is vehicle passing data that meets extraction authority information for any user identifier for the preset data pool, and does not meet a preset data filtering condition, wherein the user identifier is a user identifier in the preset correspondence.

In an implementation, after sending the first to-be-checked data to the client, the method further includes:

receiving data invalidation information fed back by the client, wherein the data invalidation information is information that is fed back by the client for first to-be-checked data when the checker logging in to the client determines that this first to-be-checked data is non-violation data;

counting and storing the number of pieces of the received data invalidation information according to the user identifier of the checker logging in to the client; and counting and storing the number of pieces of the received data invalidation information according to a checkpoint identifier of each piece of first to-be-checked vehicle passing data that is determined as non-violation data.

In an implementation, before sending the first to-be-checked data to the client, the method further includes:

setting a preset extracted mark for each piece of first to-be-checked data, so that a checker other than the target checker cannot extract the first to-be-checked data.

The communication bus in the above electronic device may be a Peripheral Component Interconnect (PCI) bus or an Extended Industry Standard Architecture (EISA) bus. The communication bus can includes an address bus, a data bus, a control bus, and the like. For convenience, the communication bus is only shown as one thick line in the figure, but it does not mean that there is only one bus or one type of bus.

The communication interface is used for communication between the above electronic device and other devices.

The memory may include a random access memory (RAM), and may also include a non-volatile memory (NVM), such as at least one disk storage. Optionally, the memory may also be at least one storage device located away from the aforementioned processor.

The above processor may be a general-purpose processor, including a central processing unit (CPU), a network processor (NP), etc.; or may be a digital signal processing (DSP), an application specific integrated circuit (ASIC), field-programmable gate array (FPGA) or other programmable logic device, discrete gate or transistor logic device, discrete hardware component.

Correspondence to the above method embodiments, an embodiment of the present application provides a computer readable storage medium. The computer readable storage medium stores a computer program. The computer program is executed by a processor to cause the processor to perform the data extraction method according to any one of the embodiments of the present application. The data extraction method may include:

obtaining a data extraction instruction sent by a client, wherein the data extraction instruction is an instruction issued by a target checker logging in to the client, and the data extraction instruction carries a user identifier of the target checker as a target user identifier;

obtaining extraction authority information for the target user identifier according to a preset correspondence and the target user identifier as target extraction authority information, wherein the preset correspondence includes: a plurality of correspondences between user identifiers and extraction authority information, and the extraction authority information is information for representing an authority of a corresponding checker to extract vehicle passing data;

extracting, from to-be-checked vehicle passing data, to-be-checked vehicle passing data that matches the target extraction authority information, as first to-be-checked data; and sending the first to-be-checked data to the client.

In the embodiments of the present application, a correspondence between each user identifier and extraction authority information is pre-set, that is, a correspondence between each checker and extraction authority information is pre-set. After a data extraction instruction sent by a target checker logging in to a client through the client is obtained, target extraction authority information may be automatically determined according to a user identifier of the target checker, i.e., target user identifier, carried in the data extraction instruction, and to-be-checked vehicle passing data matching the target extraction authority information is extracted from the to-be-checked vehicle passing data and sent to the client. Throughout data extraction, only by triggering the client to send the data extraction instruction, the target checker can obtain the required vehicle passing data without other operations, thereby reducing the number of manual operations of the checker in data extraction. This further reduces the number of manual operations in data checking and improves data checking efficiency.

Correspondence to the above method embodiments, an embodiment of the present application provides a computer program product which, when executed on a computer, causes the computer to perform the data extraction method according to any one of the above embodiments.

In the embodiments of the present application, a correspondence between each user identifier and extraction authority information is pre-set, that is, a correspondence between each checker and extraction authority information is pre-set. After a data extraction instruction sent by a target checker logging in to a client through the client is obtained, target extraction authority information may be automatically determined according to a user identifier of the target checker, i.e., target user identifier, carried in the data extraction instruction, and to-be-checked vehicle passing data matching the target extraction authority information is extracted from the to-be-checked vehicle passing data and sent to the client. Throughout data extraction, only by triggering the client to send the data extraction instruction, the target checker can obtain the required vehicle passing data without other operations, thereby reducing the number of manual operations of the checker in data extraction. This further reduces the number of manual operations in data checking and improves data checking efficiency.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

The embodiments in the specification are all described in related manners, and the same or similar parts among the embodiments may refer to each other, and each embodiment focuses on the difference from other embodiments. In particular, for the system embodiment, since it is basically similar to the method embodiment, the description is relatively simple, and the relevant parts can be referred to the description of the method embodiment.

The above description is only the preferred embodiments of the present application and is not intended to limit the protection scope of the present application. Any amendments, equivalent substitutions, improvements etc. made within the spirit and principle of the present application are all included in the protection scope of the present application.

The invention claimed is:

1. A data extraction method, comprising:
   obtaining a data extraction instruction sent by a client, wherein the data extraction instruction is an instruction issued by a target checker logging in to the client, and the data extraction instruction carries a user identifier of the target checker as a target user identifier;
   obtaining extraction authority information for the target user identifier according to a preset correspondence and the target user identifier as target extraction authority information, wherein the preset correspondence comprises: a plurality of correspondences between user identifiers and extraction authority information, and the extraction authority information is information for representing an authority of a corresponding checker to extract vehicle passing data;
   extracting, from to-be-checked vehicle passing data, to-be-checked vehicle passing data that matches the target extraction authority information, as first to-be-checked data; and
   sending the first to-be-checked data to the client;
   wherein, after sending the first to-be-checked data to the client, the method further comprises:
   receiving data invalidation information fed back by the client, wherein the data invalidation information is information that is fed back by the client for first to-be-checked data when the checker logging in to the client determines that this first to-be-checked data is non-violation data;
   counting and storing the number of pieces of the received data invalidation information according to the user identifier of the checker logging in to the client; and
   counting and storing the number of pieces of the received data invalidation information according to a checkpoint identifier of each piece of first to-be-checked vehicle passing data that is determined as non-violation data,
   and wherein, before sending the first to-be-checked data to the client, the method further comprises:
   setting a preset extracted mark for each piece of first to-be-checked data, so that a checker other than the target checker cannot extract the first to-be-checked data.

2. The method of claim 1, wherein, before extracting, from to-be-checked vehicle passing data, to-be-checked vehicle passing data that matches the target extraction authority information, as first to-be-checked data, the method further comprises:
   determining, according to the target user identifier, device authority information pre-configured for the target checker, as target device authority information, wherein the device authority information is information for representing an authority of a corresponding checker to obtain images and/or videos acquired by an image acquisition device; and
   the step of extracting, from to-be-checked vehicle passing data, to-be-checked vehicle passing data that matches the target extraction authority information, as first to-be-checked data, comprises:
   extracting, from the to-be-checked vehicle passing data, to-be-checked vehicle passing data that matches the target extraction authority information and the target device authority information, as first to-be-checked data.

3. The method of claim 2, wherein, before obtaining extraction authority information for the target user identifier according to the preset correspondence and the target user identifier as target extraction authority information, the method further comprises:
   determining, according to the preset correspondence and the target user identifier, whether a first correspondence comprising the target user identifier exists in the preset correspondence;
   when the first correspondence exists, performing the step of obtaining extraction authority information for the target user identifier according to the preset correspondence and the target user identifier as target extraction authority information; and
   when the first correspondence does not exist, the method further comprises:
   extracting, from the to-be-checked vehicle passing data, to-be-checked vehicle passing data that matches the target device authority information, as second to-be-checked data; and
   sending the second to-be-checked data to the client.

4. The method of claim 1, wherein, the to-be-checked vehicle passing data is arranged in chronological order; each piece of to-be-checked vehicle passing data contains a checkpoint identifier; the target extraction authority information comprises at least information defining that the target checker has an authority to extract to-be-checked vehicle passing data containing the target checkpoint identifier; and
   the step of extracting, from to-be-checked vehicle passing data, to-be-checked vehicle passing data that matches the target extraction authority information, as first to-be-checked data, comprises:
   traversing the to-be-checked vehicle passing data according to an arrangement order of the to-be-checked vehicle passing data, and determining a first piece of to-be-checked vehicle passing data that matches the target extraction authority information, as first vehicle passing data, wherein a checkpoint identifier contained in the first vehicle passing data is the target checkpoint identifier, and the first vehicle passing data is used as the first to-be-checked data;
   continuing to traverse the to-be-checked vehicle passing data, and sequentially determining to-be-checked vehicle passing data that meets a first preset condition, as second vehicle passing data, wherein the first preset condition comprises: to-be-checked vehicle passing data matching the target extraction authority information, and a checkpoint identifier contained therein being the same as the checkpoint identifier contained in the first vehicle passing data;
   determining the determined second vehicle passing data as the first to-be-checked data; and
   extracting all the determined first to-be-checked data.

5. The method of claim 4, wherein, determining the determined second vehicle passing data as the first to-be-checked data comprises:
   determining all the determined second vehicle passing data as the first to-be-checked data; or
   determining a first preset number of pieces of firstly determined second vehicle passing data in the determined second vehicle passing data, as the first to-be-checked data.

6. The method of claim 5, wherein, before determining the first preset number of pieces of firstly determined second vehicle passing data in the determined second vehicle passing data, as the first to-be-checked data, the method further comprises:
   determining whether the number of pieces of the determined second vehicle passing data is not less than the first preset number;
   when the number of pieces of the determined second vehicle passing data is not less than the first preset number, performing the step of determining the first preset number of pieces of firstly determined second vehicle passing data in the determined second vehicle passing data, as the first to-be-checked data;
   when the number of pieces of the determined second vehicle passing data is less than the first preset number, the method further comprises:
   determining the remaining first to-be-checked data by the following steps until the number of pieces of all the determined first to-be-checked data equals to the first preset number plus one, or, no to-be-checked vehicle passing data that matches the target extraction authority information exists in to-be-checked vehicle passing data other than the to-be-checked vehicle passing data that has been determined as the first to-be-checked data:
   step A: traversing to-be-checked vehicle passing data other than the to-be-checked vehicle passing data that has been determined as the first to-be-checked data according to the arrangement order of the to-be-checked vehicle passing data, and determining a first piece of to-be-checked vehicle passing data that matches the target extraction authority information, as new first vehicle passing data, wherein a checkpoint identifier contained in the new first vehicle passing data is the target checkpoint identifier, and the new first vehicle passing data is used as the first to-be-checked data;
   step B: continuing to traverse to-be-checked vehicle passing data other than the to-be-checked vehicle passing data that has been determined as the first to-be-checked data, and sequentially determining to-be-checked vehicle passing data that meets a second preset condition, as new second vehicle passing data, wherein the second preset condition comprises: to-be-checked vehicle passing data matching the target extraction authority information, and a checkpoint identifier contained therein being the same as the checkpoint identifier contained in the new first vehicle passing data;
   step C: determining whether the number of pieces of the determined new second vehicle passing data is not less than a first number, wherein the first number equals to the first preset number plus one and minus the number of pieces of the determined first to-be-checked data; and
   step D: selecting a first number of pieces of firstly determined new second vehicle passing data in the determined new second vehicle passing data as the first to-be-checked data, when the number of pieces of the determined new second vehicle passing data is not less than the first number; and
   returning to step A when the number of pieces of the determined new second vehicle passing data is less than the first number.

7. The method of claim 1, wherein, the to-be-checked vehicle passing data is arranged in chronological order; each piece of to-be-checked vehicle passing data contains a checkpoint identifier; the target extraction authority information comprises at least: information defining that the target checker has an authority to extract to-be-checked vehicle passing data containing the target checkpoint identifier;

the step of extracting, from to-be-checked vehicle passing data, to-be-checked vehicle passing data that matches the target extraction authority information, as first to-be-checked data, comprises:
traversing the to-be-checked vehicle passing data according to the arrangement order of the to-be-checked vehicle passing data, and determining a first piece of to-be-checked vehicle passing data that matches the target extraction authority information, as third vehicle passing data, wherein a checkpoint identifier contained in the third vehicle passing data is the target checkpoint identifier, and the third vehicle passing data is used as the first to-be-checked data;
continuing to traverse the to-be-checked vehicle passing data, and sequentially determining a second preset number of to-be-checked vehicle passing data that firstly meets a third preset condition, as the first to-be-checked data, wherein the third preset condition comprises: to-be-checked vehicle passing data matching the target extraction authority information, and a checkpoint identifier contained therein being the same as the checkpoint identifier contained in the third vehicle passing data; and
extracting all the determined first to-be-checked data.

8. The method of claim 1, wherein, before extracting, from the to-be-checked vehicle passing data, to-be-checked vehicle passing data that matches the target extraction authority information, as first to-be-checked data, the method further comprises determining the to-be-checked vehicle passing data, comprising:
extracting, from vehicle passing data, vehicle passing data that meets a preset condition, and caching the extracted vehicle passing data in a preset data pool as the to-be-checked vehicle passing data;
wherein the vehicle passing data that meets the preset condition is vehicle passing data that meets extraction authority information for any user identifier for the preset data pool, and does not meet a preset data filtering condition, wherein the user identifier is a user identifier in the preset correspondence.

9. An electronic device, comprising: a processor, a communication interface, a memory, and a communication bus, wherein the processor, the communication interface and the memory communicate with each other through the communication bus;
the memory is configured for storing a computer program;
the processor is configured to implement the data extraction method according to claim 1 when executing the computer program stored in the memory.

10. A non-transitory computer readable storage medium, wherein the storage medium stores a computer program which, when being executed, causes a processor to perform the data extraction method of claim 1.

11. A data extraction apparatus, comprising:
memory;
a first obtaining module, configured for obtaining a data extraction instruction sent by a client, wherein the data extraction instruction is an instruction issued by a target checker logging in to the client, and the data extraction instruction carries a user identifier of the target checker as a target user identifier;
a second obtaining module, configured for obtaining extraction authority information for the target user identifier according to a preset correspondence and the target user identifier as target extraction authority information, wherein the preset correspondence comprises: a plurality of correspondences between user identifiers and extraction authority information, and the extraction authority information is information for representing an authority of a corresponding checker to extract vehicle passing data;
a first extraction module, configured for extracting, from to-be-checked vehicle passing data, to-be-checked vehicle passing data that matches the target extraction authority information, as first to-be-checked data; and
a first sending module, configured for sending the first to-be-checked data to the client;
wherein the apparatus further comprises:
a receiving module, configured for after the first to-be-checked data is sent to the client, receiving data invalidation information fed back by the client, wherein the data invalidation information is information that is fed back by the client for first to-be-checked data when the checker logging in to the client determines that this first to-be-checked data is non-violation data;
a first counting and storing module, configured for counting and storing the number of pieces of the received data invalidation information according to the user identifier of the checker logging in to the client; and
a second counting and storing module, configured for counting and storing the number of pieces of the received data invalidation information according to a checkpoint identifier of each piece of first to-be-checked vehicle passing data that is determined as non-violation data,
and wherein the apparatus further comprises:
a marking module, configured for before the first to-be-checked data is sent to the client, setting a preset extracted mark for each piece of first to-be-checked data, so that a checker other than the target checker cannot extract the first to-be-checked data.

12. The apparatus of claim 11, wherein, the apparatus further comprises:
a first determination module, configured for before to-be-checked vehicle passing data that matches the target extraction authority information is extracted from to-be-checked vehicle passing data, determining, according to the target user identifier, device authority information pre-configured for the target checker, as target device authority information, wherein the device authority information is information for representing an authority of a corresponding checker to obtain images and/or videos acquired by an image acquisition device; and
the first extraction module is further configured for:
extracting, from the to-be-checked vehicle passing data, to-be-checked vehicle passing data that matches the target extraction authority information and the target device authority information, as first to-be-checked data.

13. The apparatus of claim 12, further comprising a judgment module, a second extraction module and a second sending module, wherein
the judgment module is configured for before the extraction authority information for the target user identifier is obtained according to the preset correspondence and the target user identifier as the target extraction authority information, determining, according to the preset correspondence and the target user identifier, whether a first correspondence comprising the target user identifier exists in the preset correspondence;
the second obtaining module is triggered when the first correspondence exists; and the second extraction module is triggered when the first correspondence does not exist;

the second extraction module is configured for extracting, from the to-be-checked vehicle passing data, to-be-checked vehicle passing data that matches the target device authority information, as second to-be-checked data; and the second sending module is configured for sending the second to-be-checked data to the client.

14. The apparatus of claim 11, wherein, the to-be-checked vehicle passing data is arranged in chronological order; each piece of to-be-checked vehicle passing data contains a checkpoint identifier; the target extraction authority information comprises at least information defining that the target checker has an authority to extract to-be-checked vehicle passing data containing the target checkpoint identifier;

the first extraction module comprises:

a first traversal determination unit, configured for traversing the to-be-checked vehicle passing data according to an arrangement order of the to-be-checked vehicle passing data, and determining a first piece of to-be-checked vehicle passing data that matches the target extraction authority information, as first vehicle passing data, wherein a checkpoint identifier contained in the first vehicle passing data is the target checkpoint identifier, and the first vehicle passing data is used as the first to-be-checked data;

a second traversal determination unit, configured for continuing to traverse the to-be-checked vehicle passing data, and sequentially determining to-be-checked vehicle passing data that meets a first preset condition, as second vehicle passing data, wherein the first preset condition comprises: to-be-checked vehicle passing data matching the target extraction authority information, and a checkpoint identifier contained therein being the same as the checkpoint identifier contained in the first vehicle passing data;

a first determination unit, configured for determining the determined second vehicle passing data as the first to-be-checked data; and an extraction unit, configured for extracting all the determined first to-be-checked data.

15. The apparatus of claim 14, wherein, the first determination unit comprises:

a first determination sub-module, configured for determining all the determined second vehicle passing data as the first to-be-checked data; or a second determination sub-module, configured for determining a first preset number of pieces of firstly determined second vehicle passing data in the determined second vehicle passing data, as the first to-be-checked data.

16. The apparatus of claim 15, wherein, the first determination unit further comprises a judgment sub-module and a third determination sub-module, wherein the judgment sub-module is configured for before the first preset number of pieces of firstly determined second vehicle passing data in the determined second vehicle passing data is determined as the first to-be-checked data, determining whether the number of pieces of the determined second vehicle passing data is not less than the first preset number;

the second determination sub-module is triggered when the number of pieces of the determined second vehicle passing data is not less than the first preset number; and the third determination sub-module is triggered when the number of pieces of the determined second vehicle passing data is less than the first preset number;

wherein the third determination sub-module is configured for determining the remaining first to-be-checked data until the number of pieces of all the determined first to-be-checked data equals to the first preset number plus one, or, no to-be-checked vehicle passing data that matches the target extraction authority information exists in to-be-checked vehicle passing data other than the to-be-checked vehicle passing data that has been determined as the first to-be-checked data; and the third determination sub-module comprises:

a first traversal determination subunit, configured for traversing to-be-checked vehicle passing data other than the to-be-checked vehicle passing data that has been determined as the first to-be-checked data according to the arrangement order of the to-be-checked vehicle passing data, and determining a first piece of to-be-checked vehicle passing data that matches the target extraction authority information, as new first vehicle passing data, wherein a checkpoint identifier contained in the new first vehicle passing data is the target checkpoint identifier, and the new first vehicle passing data is used as the first to-be-checked data;

a second traversal determination subunit, configured for continuing to traverse to-be-checked vehicle passing data other than the to-be-checked vehicle passing data that has been determined as the first to-be-checked data, and sequentially determining to-be-checked vehicle passing data that meets a second preset condition, as new second vehicle passing data, wherein the second preset condition comprises: to-be-checked vehicle passing data matching the target extraction authority information, and a checkpoint identifier contained therein being the same as the checkpoint identifier contained in the new first vehicle passing data;

a judgment subunit, configured for determining whether the number of pieces of the determined new second vehicle passing data is not less than a first number, wherein the first number equals to the first preset number plus one and minus the number of pieces of the determined first to-be-checked data; wherein a selecting subunit is triggered when the number of pieces of the determined new second vehicle passing data is not less than the first number; and the first traversal determination subunit is triggered when the number of pieces of the determined new second vehicle passing data is less than the first number; and the selecting subunit, configured for selecting a first number of pieces of firstly determined new second vehicle passing data in the determined new second vehicle passing data as the first to-be-checked data.

17. The apparatus of claim 11, wherein, the to-be-checked vehicle passing data is arranged in chronological order; each piece of to-be-checked vehicle passing data contains a checkpoint identifier; the target extraction authority information comprises at least: information defining that the target checker has an authority to extract to-be-checked vehicle passing data containing the target checkpoint identifier;

the first extraction module is further configured for: traversing the to-be-checked vehicle passing data according to the arrangement order of the to-be-checked vehicle passing data, and determining a first piece of to-be-checked vehicle passing data that matches the target extraction authority information, as third vehicle passing data, wherein a checkpoint identifier contained in the third vehicle passing data is the target checkpoint identifier, and the third vehicle passing data is used as the first to-be-checked data;

continuing to traverse the to-be-checked vehicle passing data, and sequentially determining a second preset number of to-be-checked vehicle passing data that firstly meets a third preset condition, as the first to-be-checked data, wherein the third preset condition comprises: to-be-checked vehicle passing data matching the target extraction authority information, and a checkpoint identifier contained therein being the same as the checkpoint identifier contained in the third vehicle passing data; and extracting all the determined first to-be-checked data.

18. The apparatus of claim 11, further comprising:
a second determination module, configured for before to-be-checked vehicle passing data that matches the target extraction authority information is extracted from the to-be-checked vehicle passing data, as first to-be-checked data, determining the to-be-checked vehicle passing data, wherein the second determination module is further configured for:

extracting, from vehicle passing data, vehicle passing data that meets a preset condition, and caching the extracted vehicle passing data in a preset data pool as the to-be-checked vehicle passing data;

wherein the vehicle passing data that meets the preset condition is vehicle passing data that meets extraction authority information for any user identifier for the preset data pool, and does not meet a preset data filtering condition, wherein the user identifier is a user identifier in the preset correspondence.

\* \* \* \* \*